(12) United States Patent
Oike et al.

(10) Patent No.: US 8,493,489 B2
(45) Date of Patent: Jul. 23, 2013

(54) SOLID-STATE IMAGING DEVICE, METHOD FOR DRIVING SOLID-STATE IMAGING DEVICE, AND ELECTRONIC APPARATUS

(75) Inventors: Yusuke Oike, Kanagawa (JP); Akihiko Kato, Tokyo (JP); Takafumi Takatsuka, Kanagawa (JP); Masaki Sakakibara, Kanagawa (JP)

(73) Assignee: Sony Corporation, Tokyo (JP)

( * ) Notice: Subject to any disclaimer, the term of this patent is extended or adjusted under 35 U.S.C. 154(b) by 96 days.

(21) Appl. No.: 13/064,339

(22) Filed: Mar. 21, 2011

(65) Prior Publication Data

US 2012/0026370 A1  Feb. 2, 2012

(30) Foreign Application Priority Data

Mar. 26, 2010  (JP) ................ P2010-072309

(51) Int. Cl.
*H04N 5/335* (2011.01)
*H04N 5/217* (2011.01)

(52) U.S. Cl.
USPC .......................................... 348/308; 348/241

(58) Field of Classification Search
USPC ......................................... 348/302–308, 241
See application file for complete search history.

(56) References Cited

U.S. PATENT DOCUMENTS

| 7,075,474 | B2 | 7/2006 | Yamagata et al. | |
| 7,129,883 | B2 * | 10/2006 | Muramatsu et al. | 341/164 |
| 7,567,280 | B2 | 7/2009 | Muramatsu et al. | |
| 8,035,696 | B2 * | 10/2011 | Yamagata et al. | 348/222.1 |
| 2006/0262205 | A1 * | 11/2006 | Lim | 348/241 |
| 2006/0284999 | A1 * | 12/2006 | Muramatsu et al. | 348/308 |
| 2008/0186388 | A1 * | 8/2008 | Yamagata et al. | 348/222.1 |
| 2008/0211954 | A1 | 9/2008 | Ota | |

FOREIGN PATENT DOCUMENTS

| JP | 2001-238132 | 8/2001 |
| JP | 2006-020172 | 1/2006 |
| JP | 2006-340044 | 12/2006 |
| JP | 2008-228265 | 9/2008 |
| JP | 2009-020172 | 1/2009 |

* cited by examiner

*Primary Examiner* — Sinh Tran
*Assistant Examiner* — Christopher K Peterson
(74) *Attorney, Agent, or Firm* — Rader, Fishman & Grauer PLLC

(57) ABSTRACT

Disclosed herein is a solid-state imaging device, including: a pixel array unit configured to be formed by two-dimensionally arranging unit pixels each having a photoelectric converter, a charge-voltage converter, a reset transistor to set the charge-voltage converter to a predetermined potential, and an amplification transistor to read out a signal converted by the charge-voltage converter; a signal processor configured to process a signal output from the unit pixel by using a reference voltage; and a setter configured to set a reset level obtained from a second unit pixel from which a signal level has been already read out as the reference voltage of the signal processor before readout of a signal level based on a signal charge accumulated or retained in the charge-voltage converter from a first unit pixel.

14 Claims, 28 Drawing Sheets

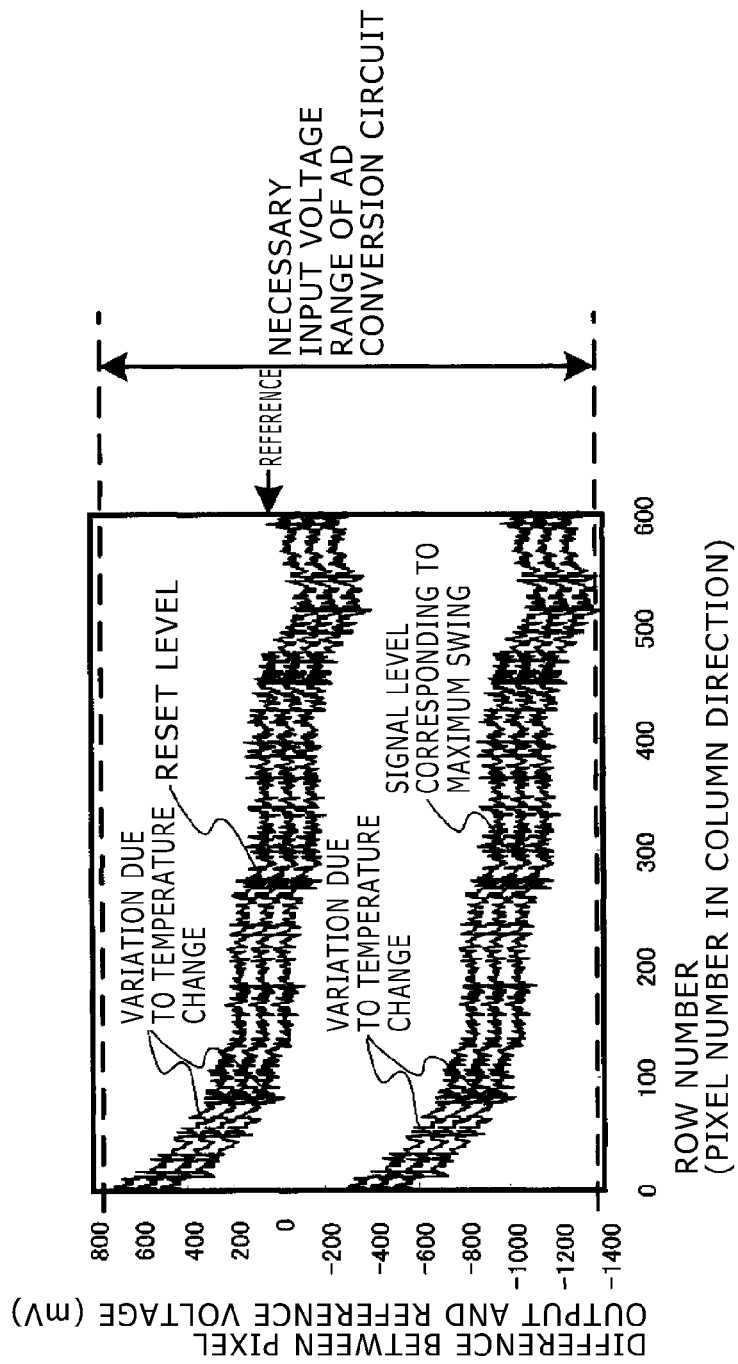

SOLID-STATE IMAGING DEVICE, METHOD FOR DRIVING SOLID-STATE IMAGING DEVICE, AND ELECTRONIC APPARATUS

BACKGROUND OF THE INVENTION

1. Field of the Invention

The present invention relates to a solid-state imaging device, a method for driving a solid-state imaging device, and an electronic apparatus.

2. Description of the Related Art

In a solid-state imaging device configured with unit pixels each including a photoelectric converter, a charge-voltage converter, and a transfer gate part to transfer a charge accumulated by the photoelectric converter to the charge-voltage converter, generally denoising processing by correlated double sampling is executed in order to remove noise in reset operation. Hereinafter, the charge-voltage converter will be represented as the FD (floating diffusion) part. The systems of the denoising processing include a system in which the denoising is performed by digital signal processing and a system in which the denoising is performed by analog signal processing.

As a solid-state imaging device that executes the denoising processing by e.g. digital signal processing, a solid-state imaging device equipped with column-parallel analog-digital converters (ADCs; AD conversion circuit) is known (refer to e.g. Japanese Patent Laid-open No. 2006-340044 (hereinafter, Patent Document 1)). In this solid-state imaging device, the ADCs are disposed on a column-by-column basis for the matrix arrangement of the unit pixels.

In the solid-state imaging device equipped with column-parallel ADCs, a reset level $V_{rst}$ read out first is set as a reference voltage $V_{zr}$ of the AD conversion circuit, and the reset level $V_{rst}$ and a signal level $V_{sig}$ are AD-converted by using this reference voltage $V_{zr}$. Specifically, by equalizing the reference voltage $V_{zr}$ to the reset level $V_{rst}$, the swing $|V_{sig}-V_{rst}|$ of the pixel output based on the signal charge can be allowed to stably fall within the input voltage range of the AD conversion circuit even if the reset level $V_{rst}$ varies due to noise.

In general, the reference voltage $V_{zr}$ of the AD conversion circuit can be adjusted only within a range sufficiently narrower than the input voltage range of the AD conversion circuit. Therefore, as the reference voltage $V_{zr}$ of the AD conversion circuit, a signal whose variation width is stably limited, like the reset level $V_{rst}$ is preferable. In contrast, a signal whose voltage greatly swings depending on the amount of incident light, like the signal level $V_{sig}$, is not suitable as the reference voltage $V_{zr}$ of the AD conversion circuit.

The denoising processing in the related-art solid-state imaging device like the above-described solid-state imaging device equipped with column-parallel ADCs is based on the premise that the reset level $V_{rst}$ is first read out and the signal level $V_{sig}$ is read out immediately after this reset level $V_{rst}$. In contrast, in a solid-state imaging device in which the reset level $V_{rst}$ cannot be read out immediately before the signal level $V_{sig}$, before AD conversion of the signal level $V_{sig}$ of a certain unit pixel, the reference voltage $V_{zr}$ cannot be acquired from the same pixel.

Examples of the solid-state imaging device in which the reset level $V_{rst}$ cannot be read out immediately before the signal level $V_{sig}$ include a complementary metal oxide semiconductor, namely CMOS image sensor having the global exposure function (refer to e.g. Japanese Patent Laid-open No. 2001-238132). In this CMOS image sensor, in order to realize collective exposure of all pixels, a charge generated in the photoelectric converter is transferred to the FD part simultaneously in all pixels and readout operation is sequentially carried out from the state in which the signal charge is retained in this FD part.

In addition, the examples of the solid-state imaging device in which the reset level $V_{rst}$ cannot be read out immediately before the signal level $V_{sig}$ include a CMOS image sensor having a memory part to retain a photocharge transferred from the photoelectric converter separately from the charge-voltage converter (refer to e.g. Japanese Patent Laid-open No. 2009-020172). Moreover, the examples include a CMOS image sensor in which a photocharge generated at a PN junction is directly read out by an amplification transistor (refer to e.g. "128×128 CMOS PHOTODIODE-TYPE ACTIVE PIXEL, SENSOR WITH ON-CHIP TIMING, CONTROL AND SIGNAL CHAINELECTRONICS" SPIE, vol. 2415, Charge-Coupled Devices and Solid State Optical Sensors V, paper no. 34 (1995)), and an image sensor using an organic photoelectric conversion film (refer to e.g. Japanese Patent Laid-open No. 2008-228265).

In the solid-state imaging device, the FD part is reset once e.g. in collective transfer in all pixels or at the start of exposure, so that a signal charge has been already accumulated or retained in the FD part at the timing of signal readout. Therefore, the following operation is necessary to remove fixed pattern noise due to e.g. threshold variation of the amplification transistor. Specifically, as shown in FIG. 24, after the signal level $V_{sig}$ is read out, the FD part is set to a predetermined potential and this predetermined potential is read out as the reset level $V_{rst}$.

However, in the solid-state imaging device in which signal readout is performed with a signal charge retained in the FD part for collective exposure of all pixels and the solid-state imaging device in which a signal charge is directly accumulated in the FD part and signal readout is performed, the FD part cannot be set to the predetermined potential immediately before readout of the signal level $V_{sig}$. In this case, the reference voltage for AD conversion of the signal level cannot be acquired. Thus, a predetermined voltage is generated by e.g. external application or a resistor array and this predetermined voltage is supplied to the AD conversion circuit as the reference voltage (refer to e.g. Japanese Patent Laid-open No. 2006-020172).

SUMMARY OF THE INVENTION

However, the reset level involves not only variation among the unit pixels but also difference due to spatially large characteristic fluctuation in the plane of the two-dimensional arrangement of the unit pixels (in-plane distribution) and change over time due to temperature change in the operation, because of threshold variation of the amplification transistor and so forth. Therefore, a sufficient margin needs to be ensured for the reset level. Thus, for the swing of the pixel output based on the signal charge that should be actually acquired, the range of the input voltage that can be converted by the AD conversion circuit needs to be broadened to a voltage range set by taking these variations into consideration additionally.

FIG. 25 shows one example of the in-plane distribution of the reset level in the vertical direction (column direction). Besides the difference in the reset level between adjacent pixels, large characteristic fluctuation in the plane (in-plane distribution) exists. As shown in FIG. 26, if a constant voltage is applied as the reference voltage, the input voltage range of the AD conversion circuit needs to be broadened because a large error occurs depending on the pixel.

For example, FIG. 27 shows the reset level and the signal level corresponding to the maximum swing with respect to the reference voltage when the maximum signal swing is −1 V. In this case, for 1 V as the peak-to-peak signal swing from the reset level to the signal level, about 2 V is necessary as the range of the input voltage that can be AD-converted. Furthermore, if the reset level fluctuates due to temperature change, the input voltage range needs to be further broadened as shown in FIG. 28 because the reference voltage takes a constant value.

In the above-described related art in which a predetermined voltage is generated by e.g. external application or a resistor array and this predetermined voltage is supplied to the AD conversion circuit as the reference voltage, there is a problem that the range of the input voltage that can be AD-converted is narrowed because the correlation between the reference voltage and the reset level is low. Furthermore, this related art has a problem that the range of the input voltage that can be AD-converted is narrowed due also to the in-plane distribution and temperature dependence of pixel variation of the reset level, and so forth.

Although the above description relates to setting of the reference voltage of the AD conversion circuit in a solid-state imaging device that executes denoising processing by digital signal processing, the above-described problems are not limited to the case of digital signal processing. Specifically, the same respects as those of the digital signal processing apply also to a solid-state imaging device that executes signal processing for an analog signal from the unit pixel by using the reference voltage (its details will be described later).

There is a need for the present invention to provide a solid-state imaging device capable of effectively removing difference due to large characteristic fluctuation in the plane (in-plane distribution) and an offset component dependent on the magnitude of parasitic capacitance, a method for driving the solid-state imaging device, and an electronic apparatus having the solid-state imaging device.

According to an embodiment of the present invention, there is provided a solid-state imaging device including a pixel array unit formed by two-dimensionally arranging unit pixels each having a photoelectric converter, a charge-voltage converter, a reset transistor to set the charge-voltage converter to a predetermined potential, and an amplification transistor to read out a signal converted by the charge-voltage converter, and a signal processor to process a signal output from the unit pixel by using a reference voltage. In the solid-state imaging device, a reset level obtained from a second unit pixel from which a signal level has been already read out is set as the reference voltage of the signal processor before readout of a signal level based on a signal charge accumulated or retained in the charge-voltage converter from a first unit pixel.

By setting the reset level obtained from the second unit pixel from which the signal level has been already read out as the reference voltage of the signal processor before readout of the signal level from the first unit pixel, the reference voltage can be set even in a solid-state imaging device in which the reset level cannot be read out before the signal level. This reference voltage has higher correlation with the reset level compared with the case of employing a predetermined voltage generated in the external as the reference voltage. Therefore, difference due to large characteristic fluctuation in the plane (in-plane distribution) and an offset component dependent on the magnitude of parasitic capacitance can be effectively removed.

The embodiment of the present invention can effectively remove difference due to large characteristic fluctuation in the plane (in-plane distribution) and an offset component dependent on the magnitude of parasitic capacitance, and thus makes it possible to decrease the margin necessary for the range of the input voltage that can be processed by the signal processer with respect to the swing of the pixel output.

BRIEF DESCRIPTION OF THE DRAWINGS

FIG. 28 is a diagram for explaining that the input voltage range needs to be broadened if the reset level fluctuates due to temperature change.

DETAILED DESCRIPTION OF THE PREFERRED EMBODIMENTS

Modes for carrying out the invention (hereinafter, represented as "embodiments") will be described in detail below with use of the drawings. The order of the description is as follows.

1. First Embodiment (example of column AD conversion circuit)
   1-1. System Configuration
   1-2. Pixel Configuration
   1-3. Denoising Processing by Correlated Double Sampling
   1-4. Description of Related Art
   1-5. Characteristic Respects of First Embodiment
2. Second Embodiment (example of column amplifier circuit)
   2-1. System Configuration
   2-2. Characteristic Respects of Second Embodiment
3. Other Pixel Configurations
4. Modification Examples
5. Electronic Apparatus (example of imaging device)

<1. First Embodiment>
[1-1. System Configuration]

Figure 1:
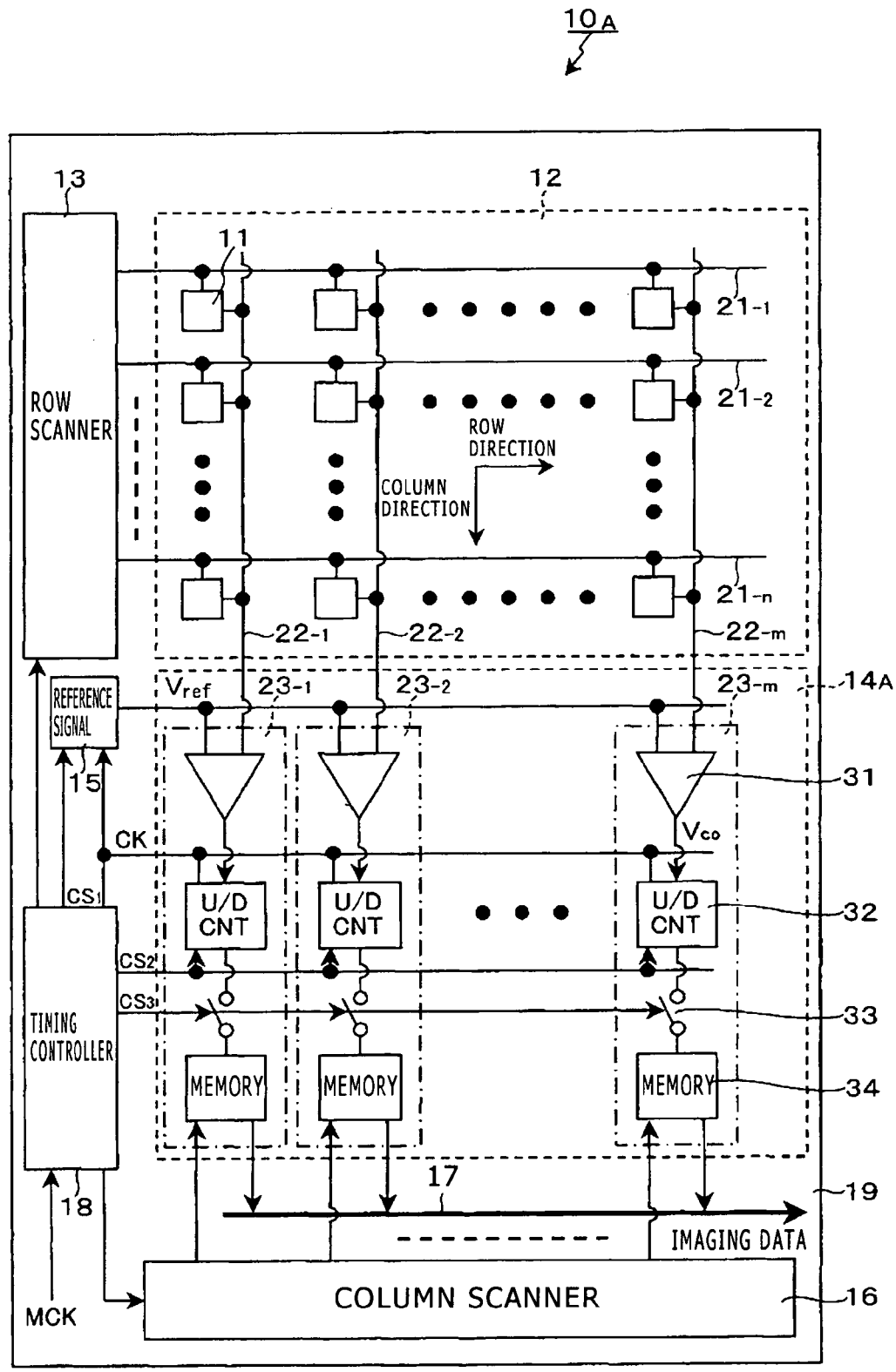
FIG. 1 is a system configuration diagram showing the outline of the configuration of a CMOS image sensor according to a first embodiment of the present invention.

FIG. 1 is a system configuration diagram showing the outline of the configuration of a solid-state imaging device according to a first embodiment of the present invention, e.g. a CMOS image sensor as one kind of solid-state imaging device of the X-Y address system. The CMOS image sensor refers to an image sensor fabricated by applying or partially using a CMOS process.

As shown in FIG. 1, a CMOS image sensor $10_A$ according to the present embodiment has a pixel array unit 12 formed by disposing a large number of unit pixels 11, a peripheral driving system to drive the respective pixels 11 of this pixel array unit 12, and a signal processing system. In the present example, as the peripheral driving system and the signal processing system, for example a row scanner 13, a column processor $14_A$, a reference signal generator 15, a column scanner 16, a horizontal output line 17, and a timing controller 18 are provided. These driving system and signal processing system are integrated on the same semiconductor substrate (chip) 19 as that of the pixel array unit 12.

In this system configuration, the timing controller 18 generates a clock signal, a control signal, and so forth serving as the basis of the operation of the row scanner 13, the column processor $14_A$, the reference signal generator 15, the column scanner 16, and so forth, based on a master clock MCK. The clock signal, the control signal, and so forth generated by the timing controller 18 are given to the row scanner 13, the column processor $14_A$, the reference signal generator 15, the column scanner 16, and so forth as driving signals for them.

The pixel array unit 12 has a configuration in which the unit pixels (hereinafter, often represented simply as "pixel") 11 each having a photoelectric converter to generate and accumulate a photocharge dependent on the amount of received light are two-dimensionally arranged along the row direction and the column direction, i.e. in a matrix. The row direction refers to the arrangement direction of the pixels on the pixel row (i.e. horizontal direction), and the column direction refers to the arrangement direction of the pixels on the pixel column (i.e. vertical direction).

In this pixel array unit 12, for the matrix pixel arrangement, row control lines 21 ($21_{-1}$ to $21_{-n}$) are wired along the row direction on each pixel row basis and column signal lines 22 ($22_{-1}$ to $22_{-m}$) are wired along the column direction on each pixel column basis. The row control line 21 transmits a control signal for carrying out control in readout from the unit pixels 11. Although the row control line 21 is shown as one line per one row in FIG. 1, the number of row control lines 21 per one row is not limited to one. Each one end of the row control lines $21_{-1}$ to $21_{-n}$ is connected to a respective one of the output terminals of the row scanner 13 for the corresponding row.

The row scanner 13 is configured with shift register, address decoder, and so forth and drives the respective pixels 11 of the pixel array unit 12 simultaneously for all pixels or on a row-by-row basis for example. That is, the row scanner 13 serves as a driver to drive the respective pixels 11 of the pixel array unit 12, together with the timing controller 18 to control this row scanner 13. This row scanner 13 generally has two scanning systems, a read scanning system and a sweep scanning system, although diagrammatic representation of its specific configuration is omitted.

The read scanning system selectively scans the unit pixels 11 of the pixel array unit 12 in turn on a row-by-row basis in order to read out a signal from the unit pixels 11. The signal read out from the unit pixel 11 is an analog signal. The sweep scanning system performs sweep scanning for the readout row for which read scanning is to be performed by the read scanning system earlier than the read scanning by the time corresponding to the shutter speed.

By the sweep scanning by this sweep scanning system, the unnecessary charge is swept out from the photoelectric converters of the unit pixels 11 on the readout row and whereby the photoelectric converters are reset. Furthermore, by the sweep (reset) of the unnecessary charge by this sweep scanning system, so-called electronic shutter operation is carried out. The electronic shutter operation refers to operation of discarding the photocharge in the photoelectric converter and newly starting exposure (starting accumulation of a photocharge).

The signal read out by readout operation by the read scanning system depends on the amount of light received after the immediately-previous readout operation or electronic shutter operation. The period from the readout timing by the immediately-previous readout operation or the sweep timing by the electronic shutter operation to the readout timing by the present readout operation corresponds to the exposure period for the photocharge in the unit pixel 11.

The column processor $14_A$ has analog-digital (AD) conversion circuits 23 ($23_{-1}$ to $23_{-m}$) provided for each of the pixel columns of the pixel array unit 12, i.e. for each of the column signal lines 22 ($22_{-1}$ to $22_{-m}$), with a one-to-one correspondence relationship for example. The AD conversion circuits 23 ($23_{-1}$ to $23_{-m}$) convert an analog signal (pixel signal) output from each unit pixel 11 of the pixel array unit 12 on a column-by-column basis to a digital signal.

The reference signal generator 15 generates a reference signal $V_{ref}$ with a so-called ramp waveform, whose voltage value changes in a staircase manner as time goes by. The reference signal generator 15 can be configured by using a digital-analog conversion (DAC) circuit for example. However, the reference signal generator 15 is not limited to a configuration using a DAC circuit.

The reference signal generator 15 generates the reference signal $V_{ref}$ of the ramp wave based on a clock CK given from the timing controller 18 under control by a control signal $CS_1$ given from the timing controller 18. Furthermore, the reference signal generator 15 supplies the generated reference signal $V_{ref}$ to the AD conversion circuits $23_{-1}$ to $23_{-m}$ of the column processor $14_A$.

All of the AD conversion circuits $23_{-1}$ to $23_{-m}$ have the same configuration. The following description will be made by taking the AD conversion circuit $23_{-m}$ as an example. The AD conversion circuit $23_{-m}$ has a comparator 31, e.g. an up/down counter (in the diagram, represented as "U/DCNT") 32 as a count unit, a transfer switch 33, and a memory device 34.

The comparator 31 compares a signal voltage $V_{out}$ of the column signal line $22_{-m}$ dependent on the pixel signal output from the unit pixel 11 on the m-th column of the pixel array unit 12 with the reference signal $V_{ref}$ of the ramp wave supplied from the reference signal generator 15. In the comparator 31, for example, its output $V_{co}$ is at the "H" level when the reference signal $V_{ref}$ is higher than the signal voltage $V_{out}$ and the output $V_{co}$ is at the "L" level when the reference signal $V_{ref}$ is equal to or lower than the signal voltage $V_{out}$.

The up/down counter 32 is an asynchronous counter and is given the clock CK from the timing controller 18 simultaneously with the reference signal generator 15 under control by a control signal $CS_2$ given from the timing controller 18. Furthermore, the up/down counter 32 performs down count or up count in synchronization with the clock CK to thereby measure the comparison period from the start of comparison operation in the comparator 31 to the end of the comparison operation.

The transfer switch 33 becomes the on- (closed) state at the timing of the completion of the count operation of the up/down counter 32 about the unit pixel 11 on a certain row under control by a control signal $CS_3$ given from the timing controller 18. Furthermore, the transfer switch 33 transfers the count result by the up/down counter 32 to the memory device 34.

In this manner, about the analog signal supplied on each pixel column basis from the respective unit pixels 11 of the pixel array unit 12 via the column signal lines $22_{-1}$ to $22_{-m}$, comparison operation is first carried out in the comparator 31 in the AD conversion circuit 23 ($23_{-1}$ to $23_{-m}$). Furthermore, in the up/down counter 32, count operation is carried out from the start of the comparison operation in the comparator 31 to the end of the comparison operation. Thereby, the analog signal is converted to a digital signal and stored in the memory device 34 ($34_{-1}$ to $34_{-m}$).

The column scanner 16 is configured with shift register, address decoder, and so forth and controls the column address and column scanning of the AD conversion circuits $23_{-1}$ to $23_{-m}$ in the column processor $14_A$. Under control by this column scanner 16, the digital signals resulting from the AD conversion by the respective AD conversion circuits $23_{-1}$ to $23_{-m}$ are read out to the horizontal output line 17 in turn and output as imaging data via this horizontal output line 17.

It is also possible to provide a circuit and so forth to execute various kinds of signal processing for the imaging data output via the horizontal output line 17 besides the above-described constituent elements, although the circuit is not particularly shown in the diagram because it has no direct relation to the present invention.

The CMOS image sensor $10_A$ equipped with column-parallel ADCs with the above-described configuration employs global exposure. Specifically, in this CMOS image sensor $10_A$, exposure start and exposure end are carried out at the same timing for all pixels 11 in the pixel array unit 12. This global exposure is performed under driving by the driver composed of the row scanner 13 and the timing controller 18. The global shutter function to realize the global exposure is shutter operation suitable to be used for imaging of a subject moving at high speed and a sensing purpose requiring the simultaneity of the captured image.

In the present example, regarding the column processor $14_A$, the configuration in which the AD conversion circuit 23 is provided for each column signal line 22 with a one-to-one correspondence relationship is taken as an example. However, the arrangement of the AD conversion circuit 23 is not limited to the arrangement based on the one-to-one correspondence relationship. For example, it is also possible to employ a configuration in which one AD conversion circuit 23 is shared by plural pixel columns and used among the plural pixel columns in a time-division manner.

[1-2. Pixel Configuration]

Figure 2:
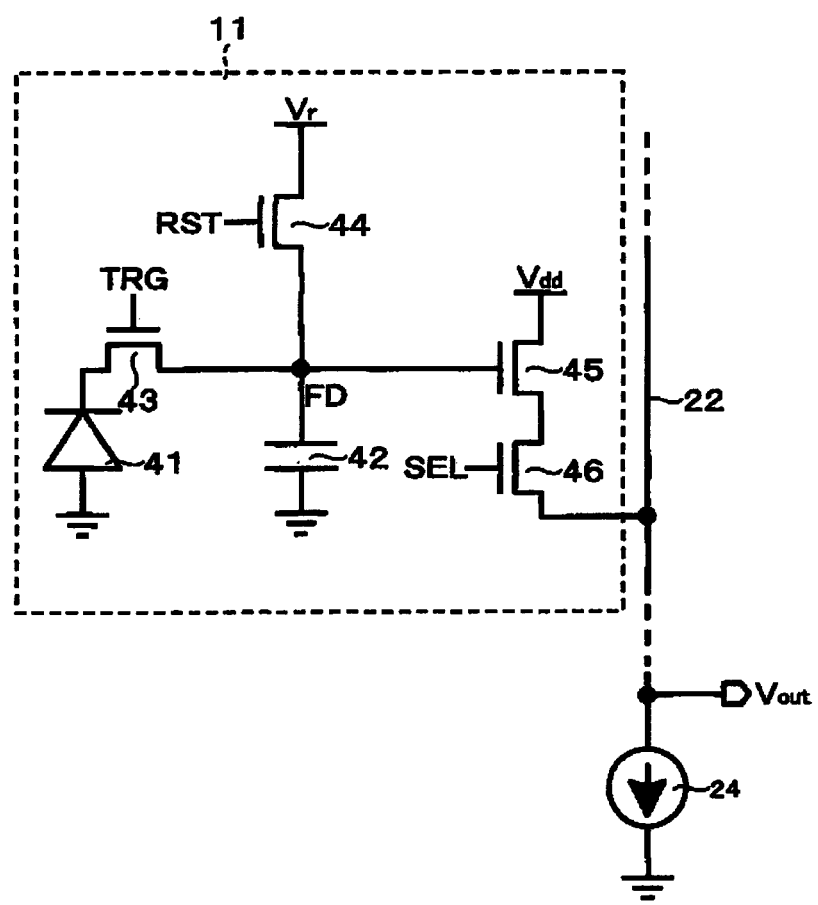
FIG. 2 is a circuit diagram showing one example of the configuration of a unit pixel.

FIG. 2 is a circuit diagram showing one example of the configuration of the unit pixel 11. As shown in FIG. 2, the unit pixel 11 according to the present configuration example has e.g. a photodiode 41 as the photoelectric converter. In addition to the photodiode 41, the unit pixel 11 has for example a charge-voltage converter 42, a transfer transistor (transfer gate part) 43, a reset transistor 44, an amplification transistor 45, and a selection transistor 46.

In this example, e.g. N-channel MOS (metal-oxide semiconductor) transistors are used as the transfer transistor 43, the reset transistor 44, the amplification transistor 45, and the selection transistor 46. However, the combination of the conductivity type of the transfer transistor 43, the reset transistor 44, the amplification transistor 45, and the selection transistor 46 exemplified here is merely one example and is not limited to this combination.

For this unit pixel 11, plural control lines are wired in common to the respective pixels on the same pixel row as the above-described row control line 21 ($21_{-1}$ to $21_{-n}$). In FIG. 2, diagrammatic representation of the plural control lines is omitted for simplification of the drawing. The plural control lines are connected to the output terminals of the row scanner 13 corresponding to a respective one of the pixel rows on each pixel row basis. The row scanner 13 properly outputs a transfer signal TRG, a reset signal RST, and a selection signal SEL to the plural control lines.

The anode electrode of the photodiode 41 is connected to the negative power supply (e.g. ground). The photodiode 41 photoelectrically converts received light to a photocharge (in this example, photoelectron) whose amount of charge depends on the amount of received light, and accumulates the photocharge. The cathode electrode of the photodiode 41 is electrically connected to the gate electrode of the amplification transistor 45 via the transfer transistor 43.

The area electrically connected to the gate electrode of the amplification transistor 45 is the charge-voltage converter 42 to convert a charge to a voltage. Hereinafter, the charge-voltage converter 42 will be referred to as the FD (floating diffusion/floating diffusion area/impurity diffusion area) part 42.

The transfer transistor 43 is connected between the cathode electrode of the photodiode 41 and the FD part 42. To the gate electrode of the transfer transistor 43, the transfer signal TRG, whose high level (e.g. $V_{dd}$ level) corresponds to the active state (hereinafter, such a signal will be represented by "High-active"), is given from the row scanner 13. The transfer transistor 43 becomes the conductive state in response to the transfer signal TRG to thereby transfer the photocharge photoelectrically converted and accumulated by the photodiode 41 to the FD part 42.

The drain electrode and source electrode of the reset transistor 44 are connected to a reset power supply $V_r$ and the FD part 42, respectively. To the gate electrode of the reset transistor 44, the High-active reset signal RST is given from the row scanner 13. The reset transistor 44 becomes the conductive state in response to the reset signal RST to thereby discard the charge in the FD part 42 to the reset power supply $V_r$ and thereby reset the FD part 42.

The gate electrode and drain electrode of the amplification transistor 45 are connected to the FD part 42 and a pixel power supply $V_{dd}$, respectively. This amplification transistor 45 serves as the input part of a source follower that is a readout circuit to read out the signal obtained by the photoelectric conversion in the photodiode 41. Specifically, due to connection of the source electrode of the amplification transistor 45 to the column signal line 22 via the selection transistor 46, the amplification transistor 45 forms the source follower together with a current source 24 connected to one end of this column signal line 22.

The drain electrode and source electrode of the selection transistor 46 are connected to the source electrode of the amplification transistor 45 and the column signal line 22, respectively, for example. To the gate electrode of the selection transistor 46, the High-active selection signal SEL is given from the row scanner 13. The selection transistor 46 becomes the conductive state in response to the selection signal SEL to thereby set the unit pixel 11 to the selected state and transmit the signal output from the amplification transistor 45 to the column signal line 22.

It is also possible to employ a circuit configuration in which the selection transistor 46 is connected between the pixel power supply $V_{dd}$ and the drain electrode of the amplification transistor 45.

[1-3. Denoising Processing by Correlated Double Sampling]

Figure 3:
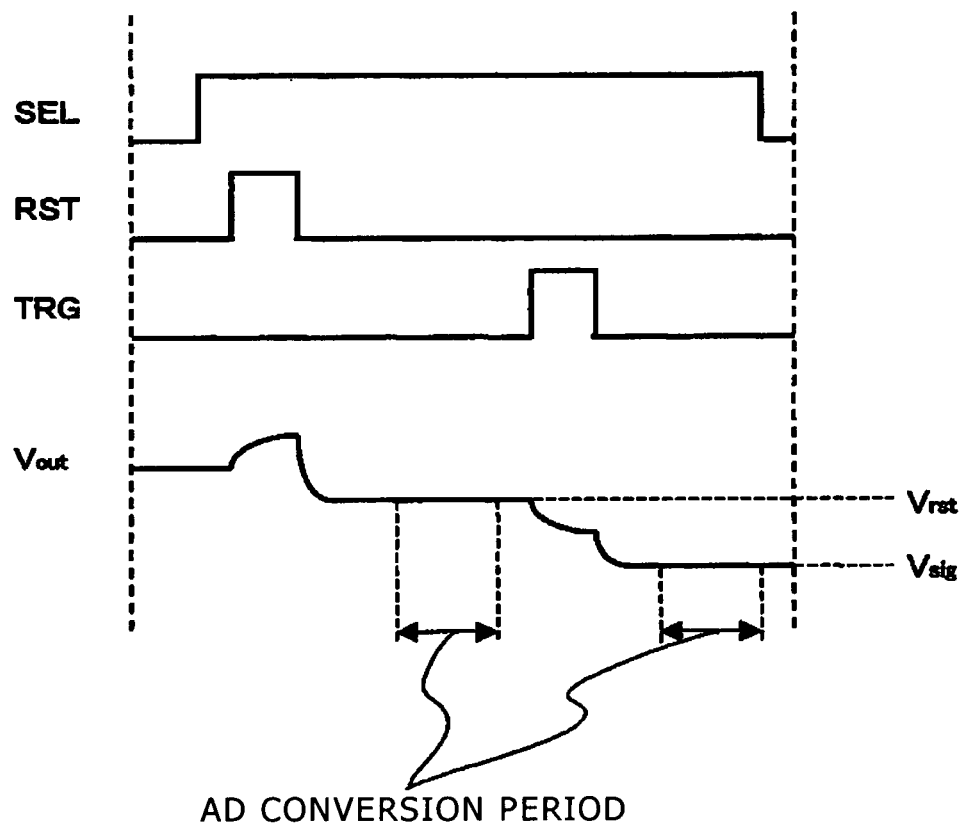
FIG. 3 is a timing waveform diagram for explaining correlated double sampling operation in the case of readout in the order of the reset level and then the signal level.

In the solid-state imaging device configured with the unit pixels 11 having the above-described configuration, in general, denoising processing by correlated double sampling is executed in order to remove noise in reset operation. As shown in FIG. 3, the unit pixel 11 selected by the selection signal SEL for readout resets the FD part 42 to a reset potential $V_r$ in response to the reset signal RST, and reads out this reset potential $V_r$ as a reset level $V_{rst}$. Subsequently, the unit pixel 11 drives the transfer transistor 43 by the transfer signal TRG to transfer the charge accumulated in the photodiode 41 to the FD part 42 and read out this charge as a signal level $V_{sig}$.

Noise randomly generated every reset (random noise), such as thermal noise and noise due to coupling of parasitic capacitance, is added to the reset level $V_{rst}$ and the signal level $V_{sig}$ when the FD part 42 is reset to the reset potential $V_r$. As these kinds of noise, noise that differs every time the FD part 42 is reset is added.

In a readout system of reading out the reset level $V_{rst}$ earlier, the random noise generated in reset is retained in the FD part 42. Therefore, the same amount of noise as that of the reset level $V_{rst}$ is retained in the signal level $V_{sig}$ read out through addition of the signal charge. Thus, a signal from which these kinds of noise are removed can be obtained by correlated double sampling operation of subtracting the reset level $V_{rst}$ from the signal level $V_{sig}$.

That is, in the correlated double sampling operation, resetting the FD part 42 and reading out the reset level before transfer of the signal charge to the FD part 42 is a condition for the removal of these kinds of reset noise. Furthermore, noise that is fixedly added (fixed pattern noise) due to e.g. threshold variation of the amplification transistor 45 used for signal readout can also be removed.

The reset level $V_{rst}$ and the signal level $V_{sig}$ read out from the unit pixel 11 are converted to a digital signal in the AD conversion circuit 23. In general, there is a limit to the range of the input voltage that can be converted by the AD conversion circuit 23. Therefore, the analog signal output from the unit pixel 11 needs to be so designed as to fall within the input voltage range of the AD conversion circuit 23.

Specifically, the voltage range from the reset level $V_{rst}$ to the signal level $V_{sig}$ that should be acquired needs to fall within the input voltage range of the AD conversion circuit 23. For example, if the reset level $V_{rst}$ is 3 V and the swing of the output based on the signal charge is −1 V, the maximum signal level that should be acquired is 2 V. In this case, the range from 2 V to 3 V is enough as the range of the input voltage that can be converted by the AD conversion circuit 23.

However, in practice, the reset level $V_{rst}$ differs from pixel to pixel attributed to e.g. threshold variation of the amplification transistor 45 and an offset due to parasitic capacitance with the column signal line 22. For example, even if the average of the reset level $V_{rst}$ of the two-dimensionally arranged unit pixels 11 is 3 V, possibly the reset level $V_{rst}$ of 3.1 V or 2.9 V is output depending on the unit pixel 11. In this case, even if the swing width of the output based on the signal charge is uniformly −1 V, the AD conversion circuit 23 must be capable of converting the input voltage in the range of 1.9 V to 3.1 V. Broadening the range of the input voltage that can be converted by the AD conversion circuit 23 is nothing more or less than enhancing the basic performance of the AD conversion circuit 23 and thus is a cause of increase in the supply voltage, the power consumption, the area, etc.

For this reason, it is preferable that the width of the input voltage range of the AD conversion circuit 23 be brought close to the swing of the output signal based on the signal charge. Therefore, a method of adjusting (shifting) the reference voltage of the AD conversion circuit 23, i.e. the reference voltage to set the range of the input voltage that can be converted by the AD conversion circuit 23, is employed. By shifting the input voltage range of the AD conversion circuit 23 based on the reference voltage, the offset component in the output signal of the pixel, i.e. the input signal of the AD conversion circuit 23, can be removed and broadening of the necessary input voltage range attributed to variation in the reset level $V_{rst}$ can be avoided.

[1-4. Description of Related Art]

Figure 4:
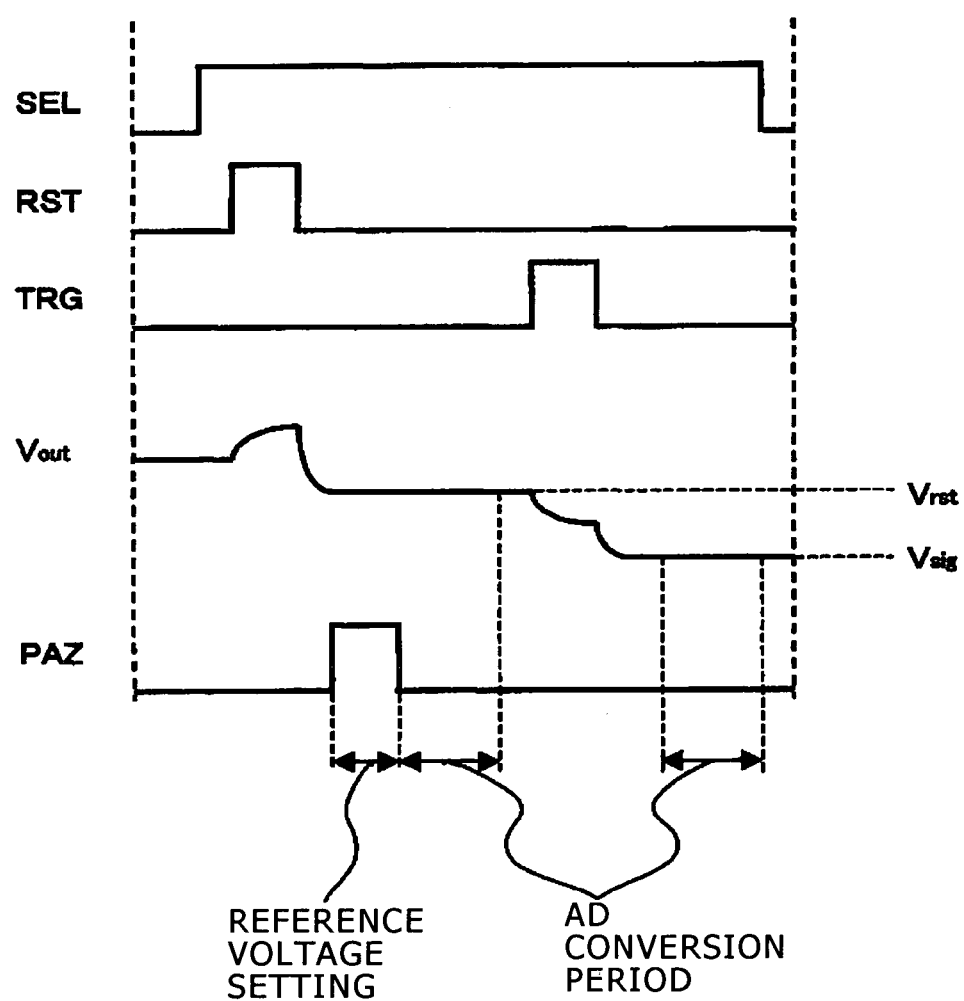
FIG. 4 is a timing waveform diagram for explaining operation when the reset level read out first is set as the reference voltage of an AD conversion circuit.

In the related art described in Patent Document 1, as shown in FIG. 4, the reset level $V_{rst}$ read out first is set as a reference voltage $V_{zr}$ of the AD conversion circuit 23 under control by a control signal PAZ, and the reset level $V_{rst}$ and the signal level $V_{sig}$ are AD-converted Specifically, by equalizing the reference voltage $V_{zr}$ to the reset level $V_{rst}$, the swing $|V_{sig} - V_{rst}|$ of the output of the unit pixel 11 based on the signal charge can be allowed to stably fall within the input voltage range of the AD conversion circuit 23 even if the reset level $V_{rst}$ varies due to noise.

Also as described above, generally the reference voltage $V_{zr}$ of the AD conversion circuit 23 can be adjusted only within a range sufficiently narrower than the input voltage range of the AD conversion circuit 23. Therefore, as the reference voltage $V_{zr}$ of the AD conversion circuit 23, a signal whose variation width is stably limited, like the reset level $V_{rst}$, is preferable. In contrast, a signal whose voltage greatly swings depending on the amount of incident light, like the signal level $V_{sig}$, is not suitable as the reference voltage $V_{zr}$ of the AD conversion circuit 23.

As just described, the related art described in patent document 1 is based on the premise that, in denoising processing, the reset level $V_{rst}$ is first read out and the signal level $V_{sig}$ is read out immediately after this reset level $V_{rst}$.

[1-5. Characteristic Respects of First Embodiment]

In contrast, the CMOS image sensor $10_A$ according to the first embodiment employs a configuration in which signal readout is performed with the signal charge retained in the FD part 42, for collective exposure of all pixels. That is, in the CMOS image sensor $10_A$ according to the first embodiment, the reset level $V_{rst}$ cannot be read out immediately before the signal level $V_{sig}$. Therefore, before AD conversion of the signal level $V_{sig}$ of a certain unit pixel, the reference voltage $V_{zr}$ cannot be acquired from the same pixel.

To address this problem, in the first embodiment, before readout of the signal level of a certain unit pixel (first unit pixel), the reset level of the FD part 42 in the unit pixel from which readout of the signal level has been already completed (second unit pixel) is read out and this reset level is set as the reference voltage of the AD conversion circuit 23. This reference voltage serves as the basis of the range of the input voltage that can be converted by the AD conversion circuit 23. By adjusting (shifting) the reference voltage, the input voltage range with respect to the input signal is determined.

Specifically, immediately before readout of the signal level of the certain unit pixel, e.g. the pixel row that is one row before is selected and the FD part 42 is reset, to thereby read out the reset level and set it as the reference voltage of the AD conversion circuit 23. Subsequently, the signal level of the subject pixel is read out. In addition, the FD part 42 is reset to a predetermined potential and this reset level is read out as the noise level. Denoising is performed by subtracting the reset level of the same pixel from the signal level (taking the difference). At this time, the reference voltage of the AD conversion circuit 23 is set by the reset level of the pixel on the previous row. If the denoising is unnecessary, the last readout of the reset level may be omitted.

As the unit pixel selected for reading out the reset level (second unit pixel), a pixel having high correlation physically with the subject pixel from which a signal is to be read out (first unit pixel) is preferable. The pixel having high correlation physically refers to a pixel having the same layout shape or a pixel existing in the vicinity on the two-dimensional arrangement.

Selecting the pixel having high correlation physically makes it possible to effectively remove spatially large characteristic fluctuation in the two-dimensional arrangement and an offset component dependent on the magnitude of parasitic capacitance. For example, in the case of two-dimensional arrangement of the pixels having the same layout shape, it is preferable to acquire the reference voltage from the reset level of the row (pixel) read out immediately before.

In the case in which the layout shape is different between even-numbered rows and odd-numbered rows, such as the case of pixel sharing, it is preferable to acquire the reference voltage from the reset level of the row (pixel) that is two rows before, having the same shape. By selecting the pixel having arrangement and physical shape of higher correlation for the reference voltage, the error between the reset level of the pixel from which a signal is to be read out and the reference voltage can be decreased.

(Pixel Sharing)

Figure 5:
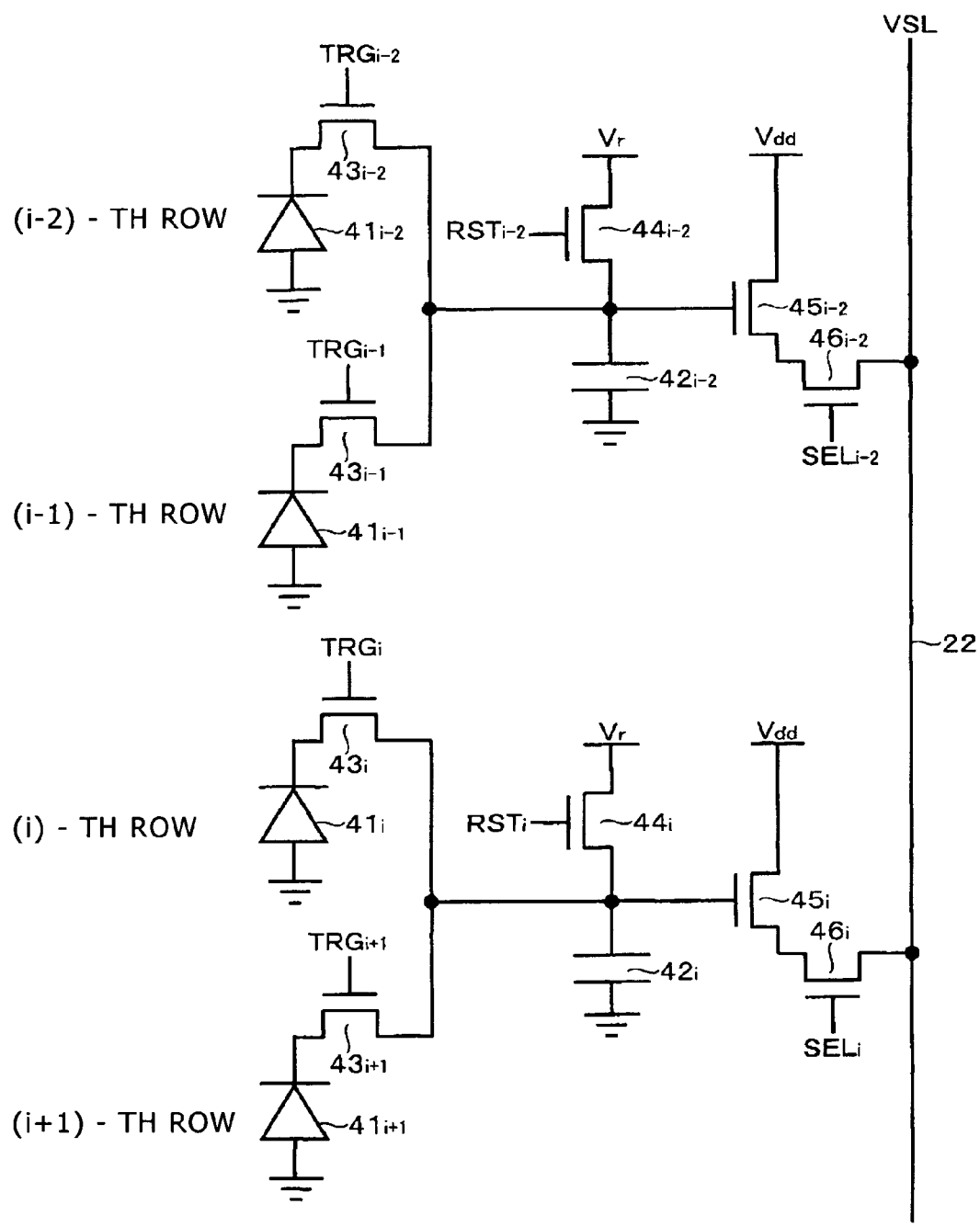
FIG. 5 is a circuit diagram showing one example of the circuit configuration in the case of two-pixel sharing.

FIG. 5 is a circuit diagram showing one example of the circuit configuration in the case of pixel sharing. FIG. 5 shows a circuit when part of the circuit elements configuring the unit pixel 11 is shared between adjacent two pixels on the same pixel column, as one example. However, the circuit configuration is not limited to one based on this pixel sharing.

In this circuit example of the two-pixel sharing, the FD part 42, the reset transistor 44, the amplification transistor 45, and the selection transistor 46 can be shared between two pixels. Specifically, the FD part $42_i$, the reset transistor $44_i$, the amplification transistor $45_i$, and the selection transistor $46_i$ of the unit pixel $11_i$ on the i-th pixel row are shared between this unit pixel $11_i$ and the unit pixel $11_{i+1}$ on the (i+1)-th pixel row. The FD part $42_{i-2}$, the reset transistor $44_{i-2}$, the amplification transistor $45_{i-2}$, and the selection transistor $46_{i-2}$ of the unit pixel $11_{i-2}$ on the (i−2)-th pixel row are shared between this unit pixel $11_{i-2}$ and the unit pixel $11_{i-1}$ on the (i−1)-th pixel row.

Figure 6:
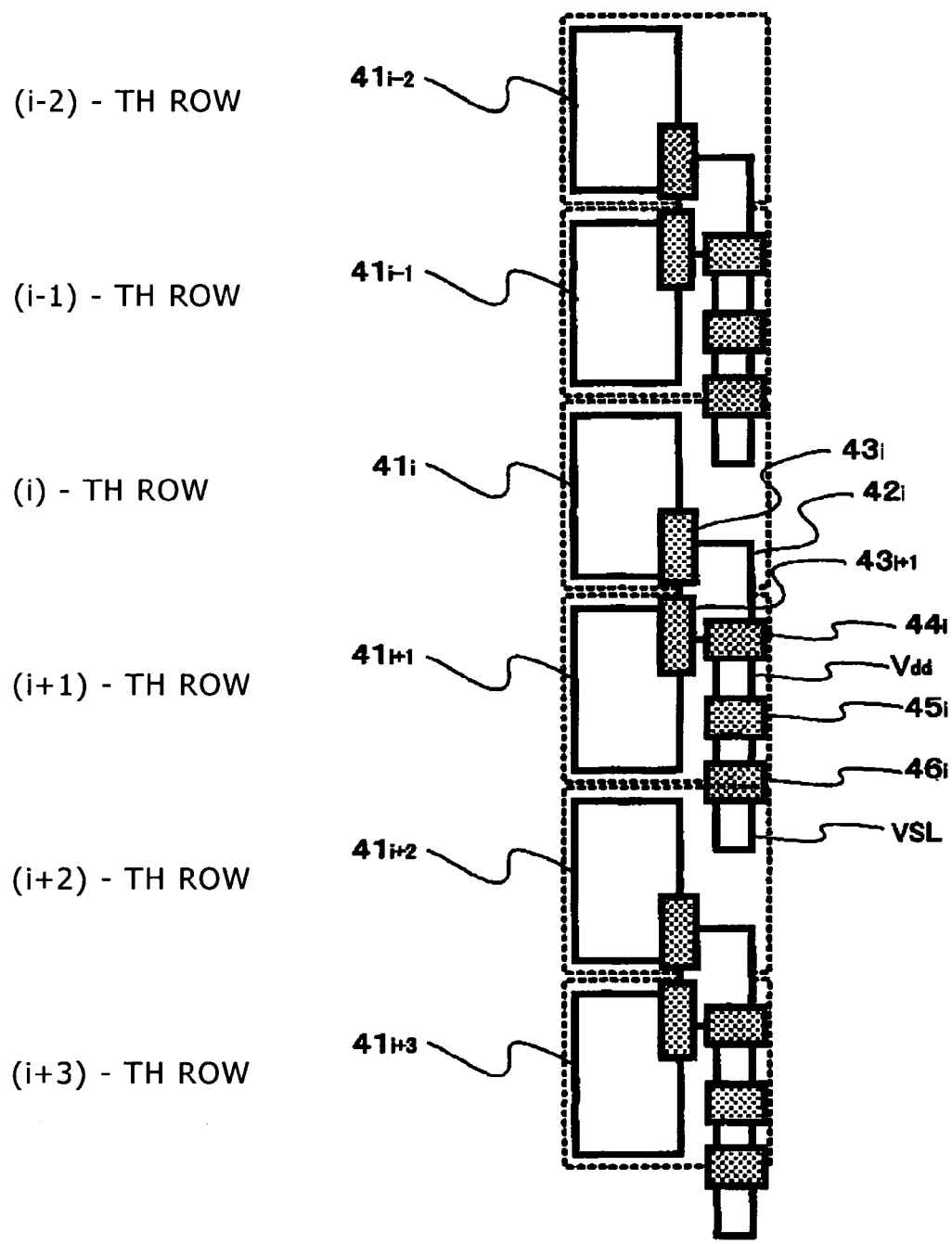
FIG. 6 is a planar pattern diagram showing one example of the layout in the case of the two-pixel sharing.

FIG. 6 shows one example of the layout (element arrangement) in the case of the circuit example of the two-pixel sharing. For example, in the combination of the unit pixel $11_i$ on the i-th pixel row and the unit pixel $11_{i+1}$ on the (i+1)-th pixel row, the layout shape should be different between two pixels $11_i$ and $11_{i+1}$ to equalize the distance between the transfer transistor $43_i$ and the shared FD part $42_i$ to the distance between the transfer transistor $43_{i+1}$ and the same FD part $42_i$. Furthermore, in this layout, two pixels having the different layout shapes are regarded as the unit and this unit is repeatedly disposed. Therefore, in the case of the circuit example of the two-pixel sharing, the layout shape is different between even-numbered rows and odd-numbered rows in the layout.

(Comparator used in AD Conversion Circuit)

Figure 7:
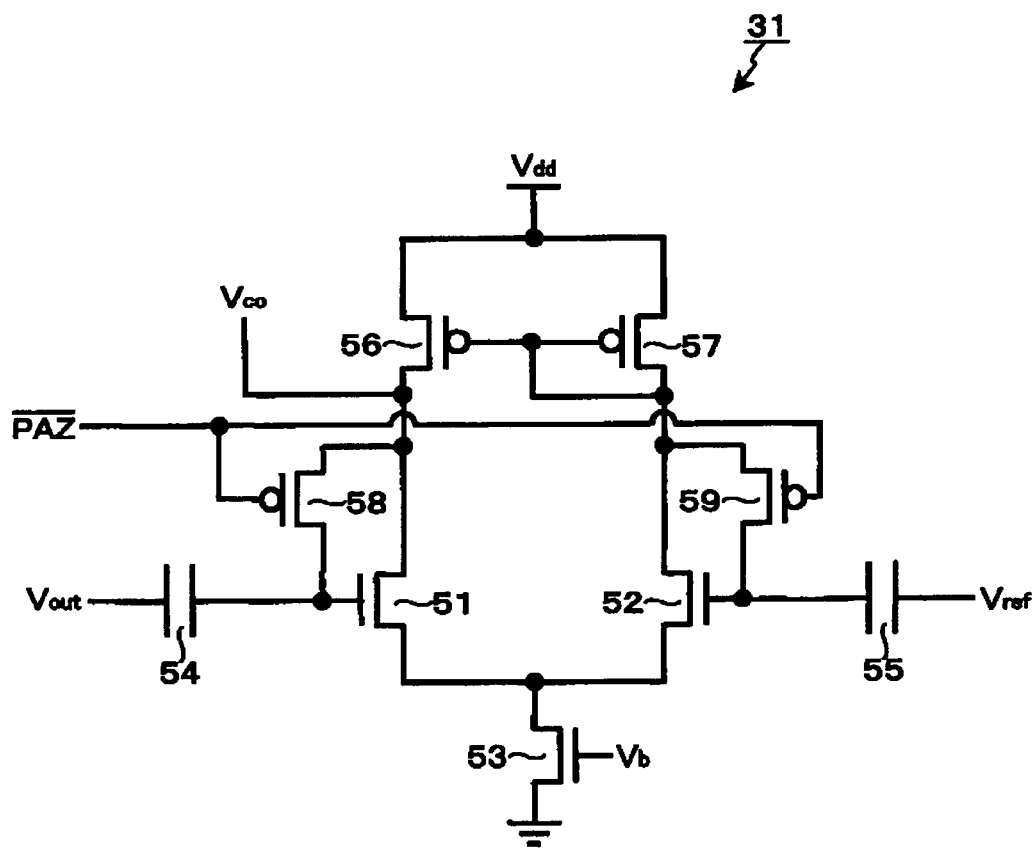
FIG. 7 is a circuit diagram showing a configuration example of a comparator used in the AD conversion circuit.

FIG. 7 is a circuit diagram showing a configuration example of the comparator 31 used in the AD conversion circuit 23. The comparator 31 according to the present example has differential pair transistors 51 and 52 having source electrodes connected in common and a current source transistor 53 connected between this source common node and the ground. N-channel MOS transistors are used as the differential pair transistors 51 and 52 and the current source transistor 53.

To the gate electrode of the MOS transistor 51, the signal voltage $V_{out}$ supplied from the unit pixel 11 through the column signal line $22_{-m}$ is given via a capacitor 54. To the gate electrode of the transistor 52, the reference signal $V_{ref}$ of a staircase wave generated by the reference signal generator 15 is given via a capacitor 55. A P-channel MOS transistor 56 is connected between the drain electrode of the MOS transistor 51 and a power supply $V_{dd}$. A P-channel MOS transistor 57 having a diode-connected configuration, i.e. having the gate electrode and drain electrode connected in common, is connected between the drain electrode of the MOS transistor 52 and the power supply $V_{dd}$. The gate electrodes of the MOS transistors 56 and 57 are connected in common to each other.

A P-channel MOS transistor 58 is connected between the gate electrode and drain electrode of the MOS transistor 51. A P-channel MOS transistor 59 is connected between the gate electrode and drain electrode of the MOS transistor 52. To the respective gate electrodes of these MOS transistors 58 and 59, the inversion signal of the control signal PAZ to carry out control for setting the reference voltage is applied.

The control signal PAZ is generated by the timing controller 18 in FIG. 1. In this case, the timing controller 18 has also the function as the setter to set the reference voltage of the AD conversion circuit 23.

Figure 8:
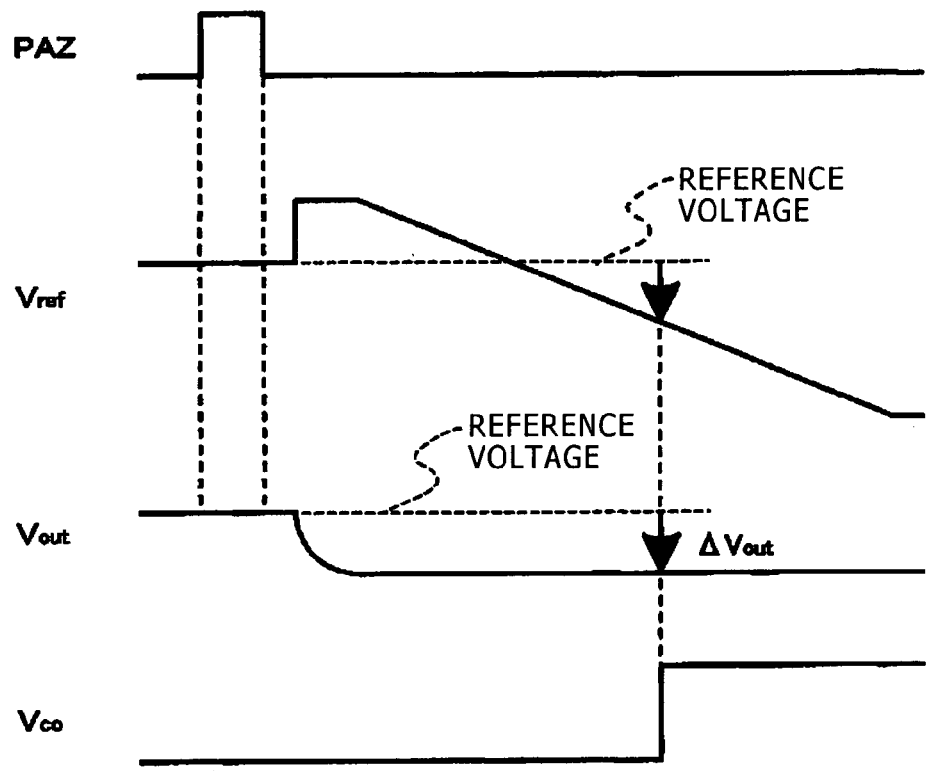
FIG. 8 is a timing waveform diagram showing the waveforms of respective parts of the comparator.

FIG. 8 shows the waveforms of the respective parts of the comparator 31, i.e. the respective waveforms of the control signal PAZ, the reference signal $V_{ref}$, the signal voltage $V_{out}$ of the column signal line 22$_{-m}$, and the comparison output $V_{co}$ of the comparator 31.

The reference voltage of the AD conversion circuit 23 is retained in the capacitors 54 and 55 by the application of the inversion signal of the control signal PAZ to the respective gate electrodes of the MOS transistors 58 and 59. Furthermore, in the comparator 31, the reference signal (reference voltage) $V_{ref}$ is compared with the signal voltage $V_{out}$ of the column signal line 22$_{-m}$. In association with change in the reference signal $V_{ref}$, the transition timing of the result $V_{co}$ of the comparison with the signal voltage $V_{out}$ is retained as a digital signal.

The transition of the comparison result $V_{co}$ occurs when the reference signal $V_{ref}$ and the signal voltage $V_{out}$ each have the same swing from the reference voltage acquired by the control signal PAZ. The AD conversion circuit 23 to which the embodiment of the present invention is applied is not limited to the present configuration as long as it has a unit for setting the reference voltage to adjust the input voltage range.

Operation and Effects of First Embodiment

In the CMOS image sensor 10$_A$ equipped with column-parallel ADCs, the following operation and effects can be achieved by reading out the reset level of a unit pixel from which readout of the signal level has been already completed and setting the reset level as the reference voltage of the AD conversion circuit 23 before readout of the signal level of a certain unit pixel. Specifically, difference due to large characteristic fluctuation in the plane (in-plane distribution) and an offset component dependent on the magnitude of parasitic capacitance can be effectively removed.

Figure 9:
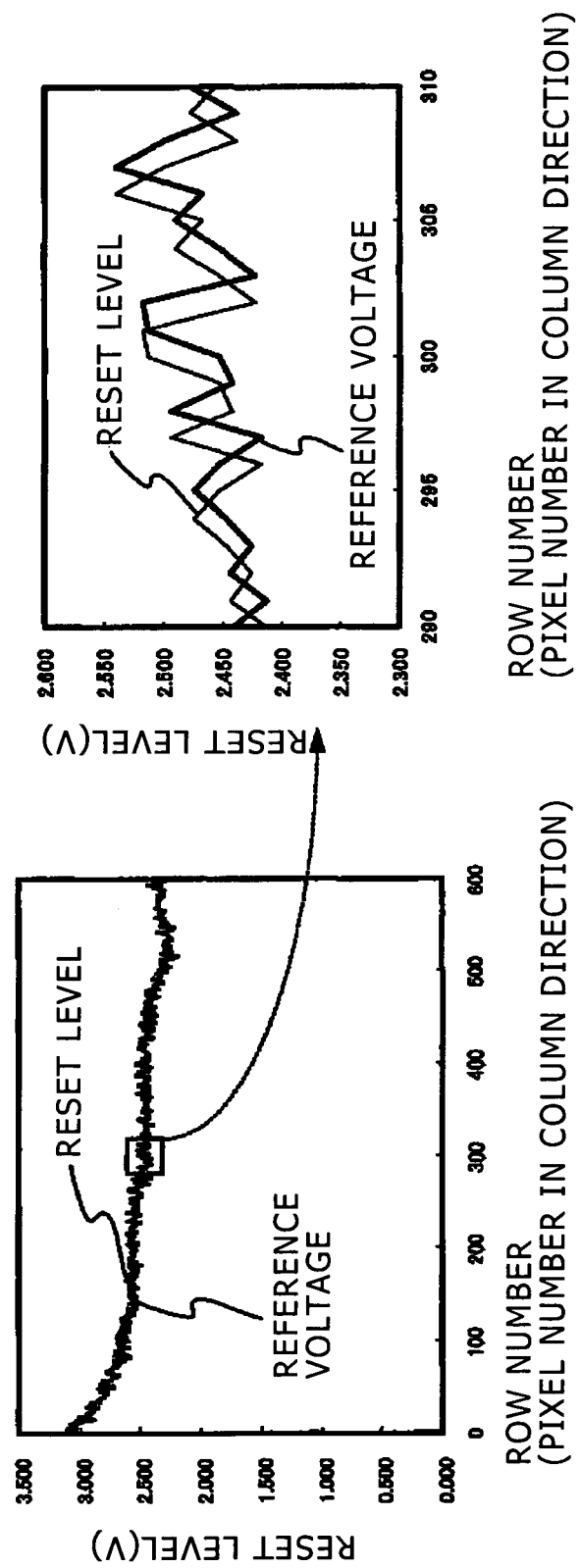
FIG. 9 is a diagram showing the in-plane distribution of the reset level and the reference voltage set by using the reset level of the immediately-previous row.
Figure 10:
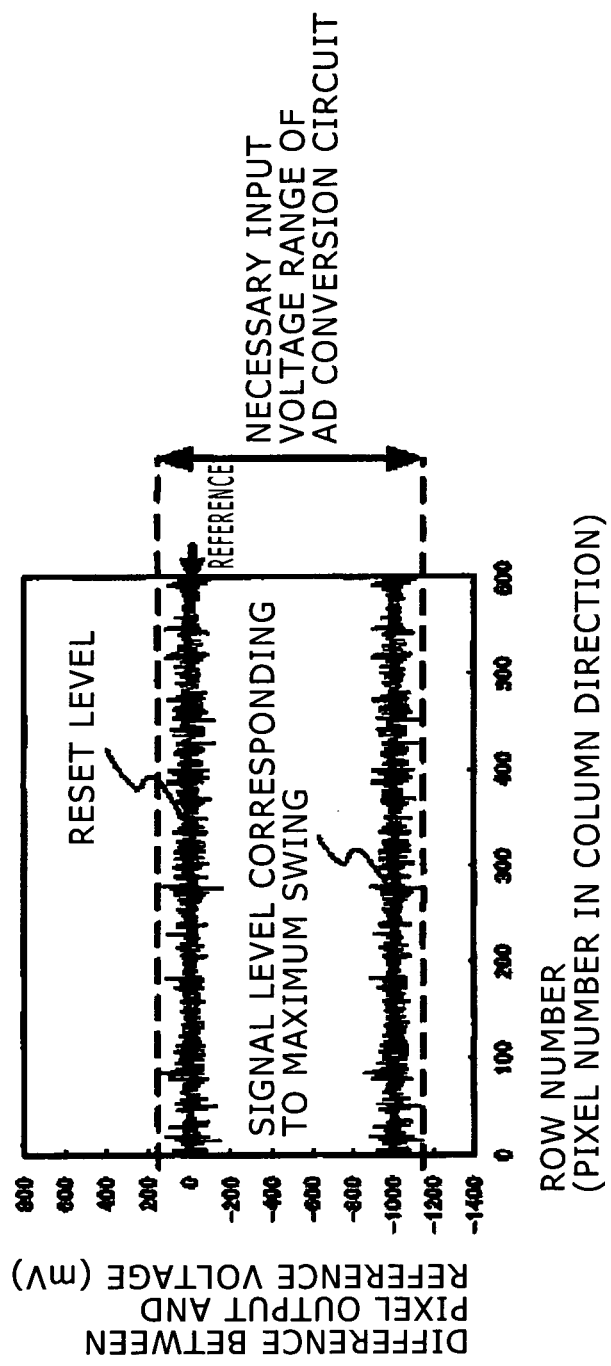
FIG. 10 is a diagram for explaining that narrowing of the necessary input voltage range of the AD conversion circuit is allowed.

FIG. 9 shows the in-plane distribution of the reset level and the reference voltage set by using the reset level of the immediately-previous row. Although the reset level and the reference voltage arise from different pixels and thus have an error, difference due to large characteristic fluctuation in the plane (in-plane distribution) and an offset component dependent on the magnitude of parasitic capacitance can be effectively removed. Therefore, as shown in FIG. 10, the necessary input voltage range of the AD conversion circuit 23 can be narrowed. Even when the reset level varies in response to temperature variation, the input voltage range of the AD conversion circuit 23 does not need to be broadened because the reference voltage follows the variation of the reset level.

Figure 11:
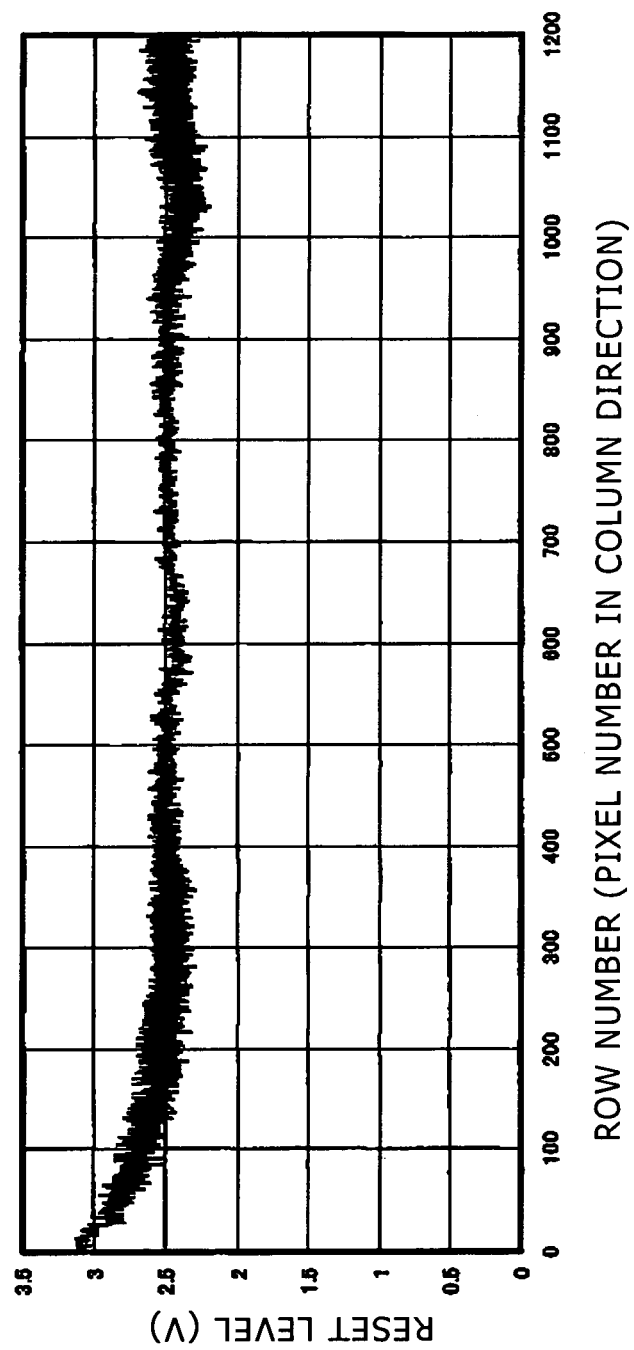
FIG. 11 is a diagram for explaining the reset level when pixels having plural layout shapes exist in a mixed manner.
Figure 12:
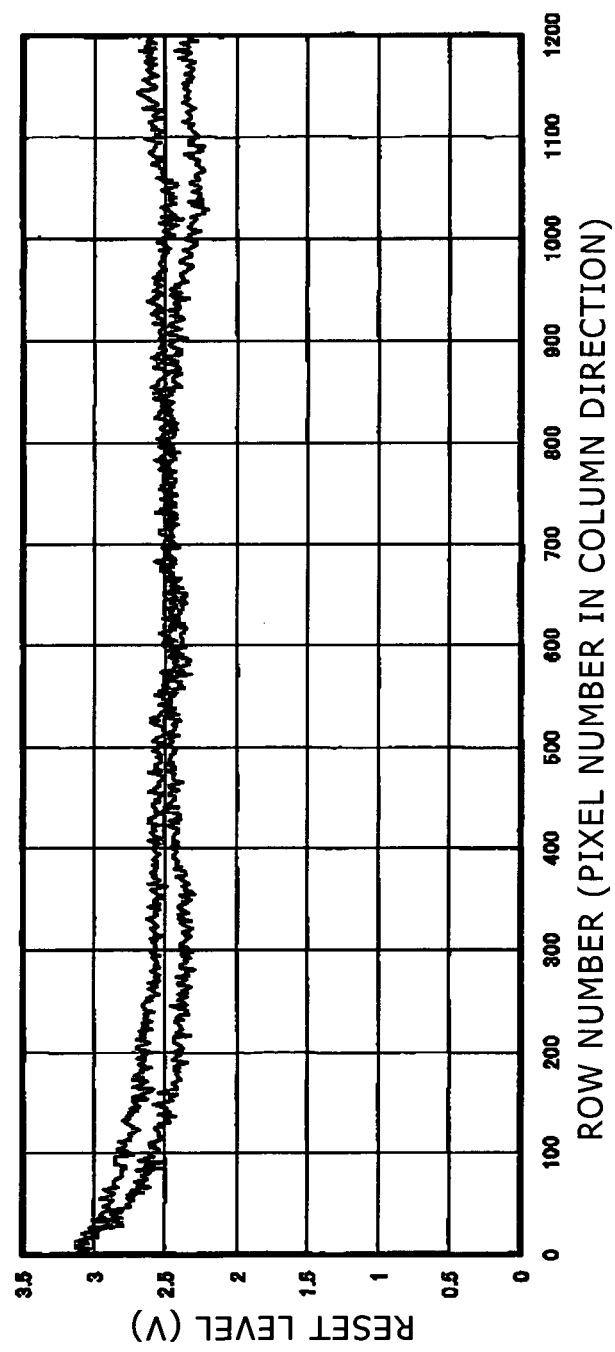
FIG. 12 is a diagram for explaining the reset level and the in-plane distribution when a pixel pattern in which the layout shape is different between even-numbered rows and odd-numbered rows is employed.

If pixels having plural layout shapes exist in a mixed manner, difference in the tendency attributed to the layout shapes occurs in the reset level as shown in FIG. 11. For example, if a pixel pattern in which the layout shape is different between even-numbered rows and odd-numbered rows is employed, the respective rows have different reset level and in-plane distribution as shown in FIG. 12.

Figure 13:
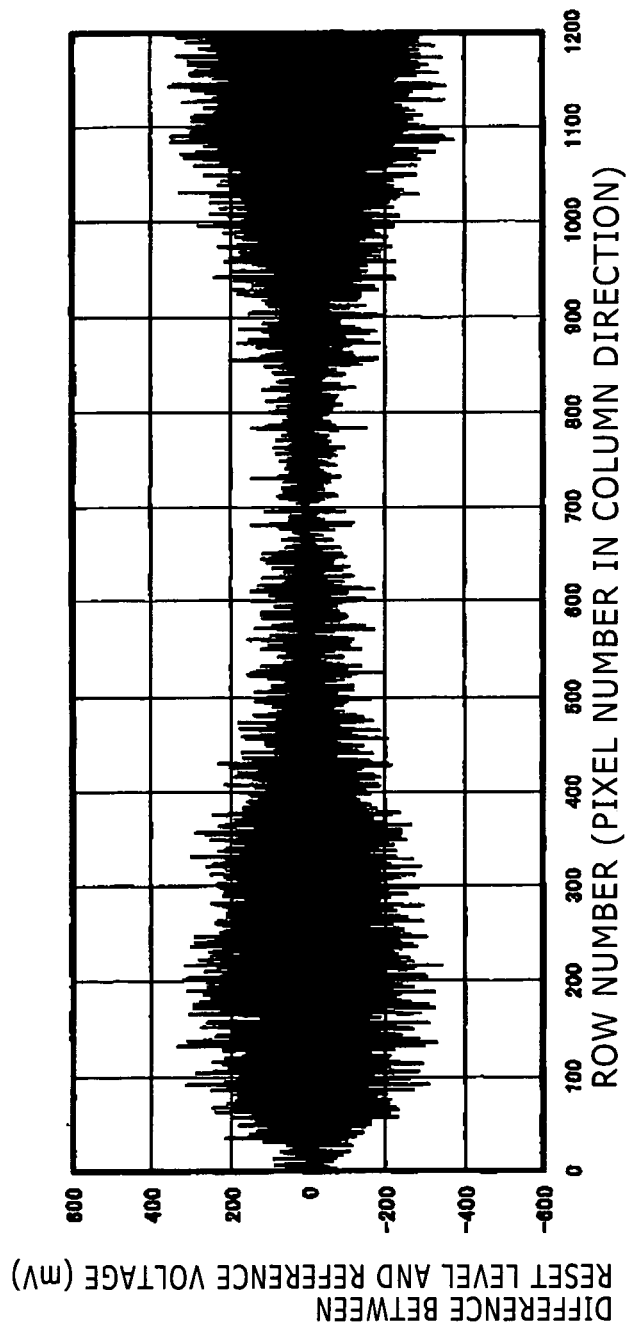
FIG. 13 is a diagram for explaining the case of reading out the reset level from a pixel from which readout has been completed immediately before and that has a different layout shape.

Therefore, if the reset level is read out from the pixel from which readout has been completed immediately before and that has the different layout shape, the effect to reduce the difference between the reset level and the reference voltage is lowered as shown in FIG. 13. Thus, the pixel from which readout has been completed immediately before and that has the same layout shape is selected and its reset level is set as the reference voltage. This makes it possible to enhance the correlation between the reset level and the reference voltage.

Figure 14:
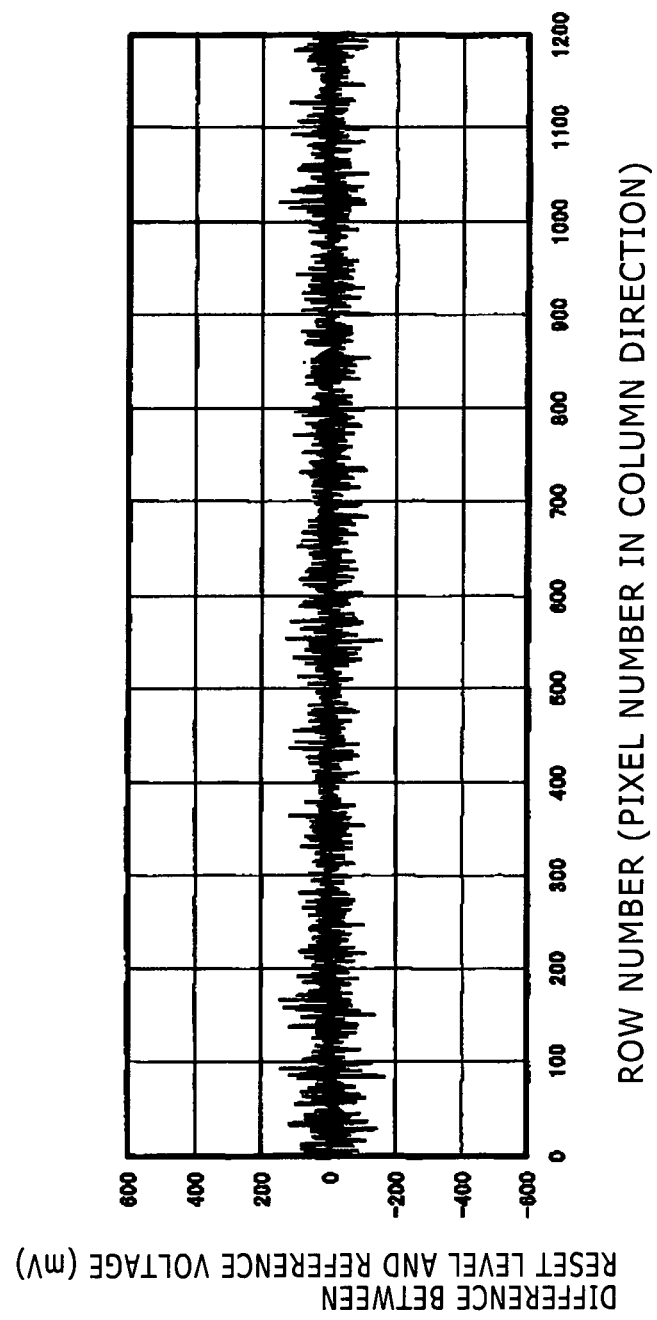
FIG. 14 is a diagram for explaining the case of selecting a pixel from which readout has been completed immediately before and that has the same layout shape, and setting its reset level as the reference voltage.

Thus, as shown in FIG. 14, the difference between the reset level and the reference voltage can be effectively reduced.

This makes it possible to decrease the margin necessary for the range of the input voltage that can be converted by the AD conversion circuit 23 with respect to the swing of the pixel output. Because the margin necessary for the input voltage range can be decreased, reduction in the supply voltage and power consumption of the AD conversion circuit 23 can be achieved.

Descriptions will be made below about specific working examples for reading out the reset level of the FD part 42 in a unit pixel from which readout of the signal level has been already completed and setting this reset level as the reference voltage of the AD conversion circuit 23 before readout of the signal level of a certain unit pixel.

Working Example 1

Figure 15:
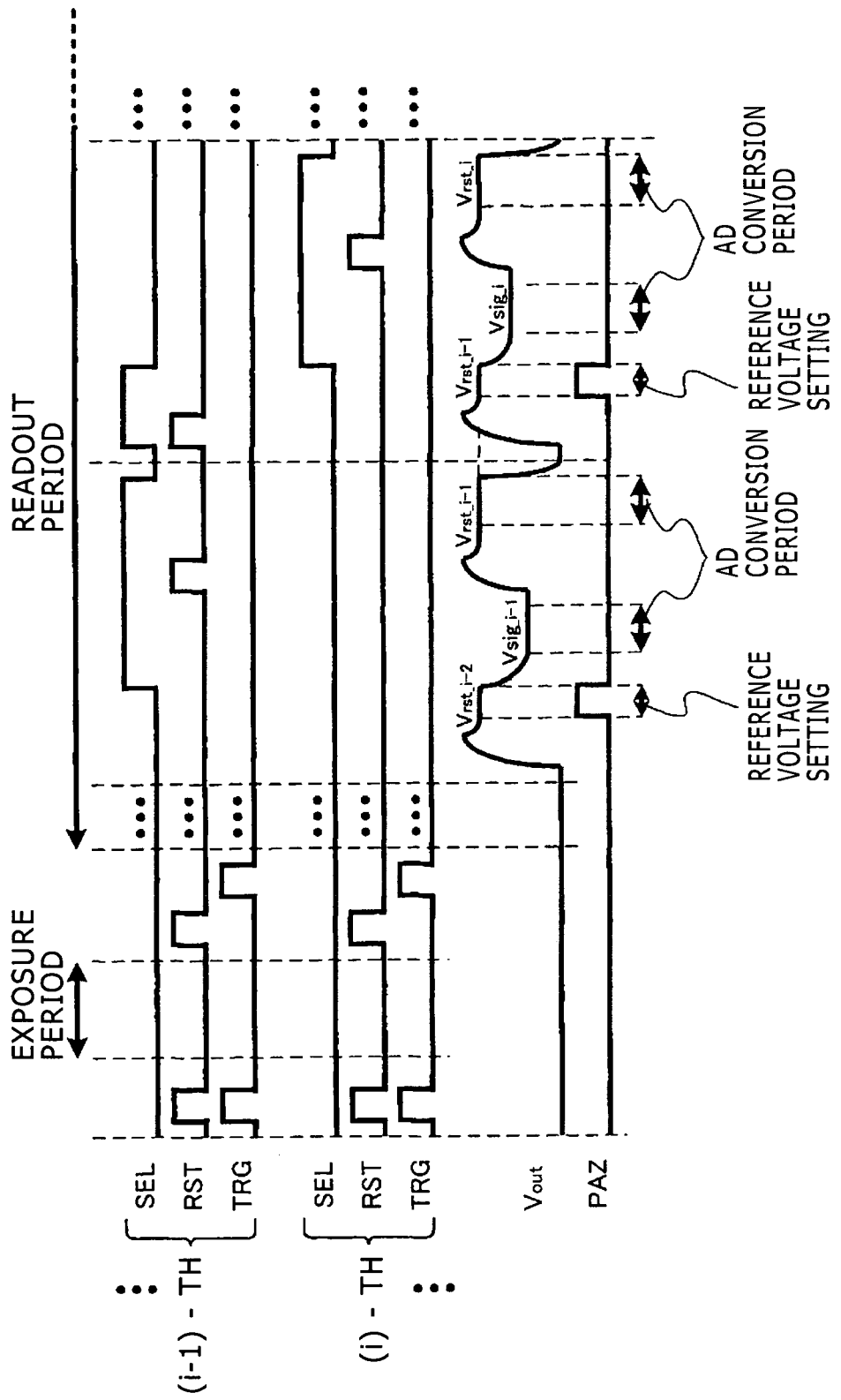
FIG. 15 is a timing waveform diagram for explaining a driving method according to working example 1.

FIG. 15 is a timing waveform diagram for explaining a driving method according to working example 1. As shown in FIG. 15, in readout of the signal of the pixel on the i-th pixel row, the (i−1)-th pixel row, from which readout has been performed immediately before, is selected and the FD part 42 is reset to the reset potential $V_r$. Furthermore, the reset level $V_{rst\_i-1}$ is read out and this reset level $V_{rst\_i-1}$ is set as the reference voltage $V_{zr}$ of the AD conversion circuit 23.

Subsequently, the i-th pixel row is selected and the signal level $V_{sig\_i}$ is read out to carry out AD conversion. Thereafter, the FD part 42 in the pixel on the i-th pixel row is reset to the reset potential $V_r$ and the reset level $V_{rst\_i}$ is read out as the noise level to carry out AD conversion. In this AD conversion, denoising processing by correlated double sampling of subtracting the reset level $V_{rst\_i}$ from the signal level $V_{sig—i}$ is executed.

The operation sequence of this correlated double sampling will be described with reference to the system configuration of FIG. 1.

First, the reference signal $V_{ref}$ of a staircase wave is input from the reference signal generator 15 to the comparator 31, and simultaneously the clock CK is given from the timing controller 18 to the up/down counter 32. Thereby, in the up/down counter 32, the comparison time in the comparator 31 in the first round of readout operation is measured by e.g. up-count operation.

When the reference signal $V_{ref}$ and the signal voltage $V_{out}$ of the column signal lines 22$_{-1}$ to 22$_{-m}$ become equal to each other, the output $V_{co}$ of the comparator 31 is inverted from the "H" level to the "L" level. In response to this polarity inversion of the comparison output $V_{co}$ of the comparator 31, the up/down counter 32 stops the up-count operation and retains the count value dependent on the first round of the comparison period in the comparator 31. In this first round of the readout operation, the signal level $V_{sig\_i}$ dependent on the amount of incident light of each unit pixel 11, including the reset level $V_{rst\_i}$ of the unit pixel 11, is read out.

In the second round of the readout operation, the reset level $V_{rst\_i}$ is read out as the noise level by operation similar to the first round of the readout operation for the signal level $V_{sig\_i}$. Specifically, after the second round of the readout from the unit pixels 11 on the selected row i to the column signal lines 22$_{-1}$ to 22$_{-m}$ has become stable, the reference signal $V_{ref}$ is given from the reference signal generator 15 to the respective comparators 31 of the AD conversion circuits 23$_{-1}$ to 23$_{-m}$, and thereby comparison operation is carried out in the comparator 31. Simultaneously, in the up/down counter 32, the second round of the comparison time in the comparator 31 is measured by count operation in the opposite direction to the direction for the first round, i.e. by down-count operation.

By setting the count operation of the up/down counter 32 to e.g. up-count operation in the first round and to down-count operation in the opposite direction in the second round in this manner, subtraction processing of (first round of comparison period)−(second round of comparison period) is automatically executed in this up/down counter 32. Furthermore, the polarity inversion of the comparison output $V_{co}$ of the comparator 31 occurs when the reference signal $V_{ref}$ and the signal voltage $V_{out}$ of the column signal lines $22_{-1}$ to $22_{-m}$ become equal to each other, and the count operation of the up/down counter 32 stops in response to this polarity inversion. As a result, the count value dependent on the result of the subtraction processing of (first round of comparison period)−(second round of comparison period) is retained in the up/down counter 32.

A relationship of (first round of comparison period)−(second round of comparison period)=(signal level $V_{sig\_i}$+reset level $V_{rst\_i}$)−(reset level $V_{rst\_i}$)=(signal level $V_{sig\_i}$) holds. By the above-described two times of readout operation and the subtraction processing in the up/down counter 32, the reset level $V_{rst\_i}$ including variation among the unit pixels 11 is removed and thus the signal level $V_{sig\_i}$ dependent on the amount of incident light of each unit pixel 11 can be extracted. The above-described flow is the operation sequence of the correlated double sampling.

In the present working example, as is apparent from the timing waveform diagram of FIG. 15, the selection signal SEL is temporarily set to the inactive state in transition from the readout operation for the (i−1)-th pixel row to the reference voltage setting period for the i-th pixel row. However, it is possible that the selection signal SEL is continuously kept in the active state if the pixel row that is one row before is selected and the reset level of this pixel row is read out to be set as the reference voltage of the AD conversion circuit 23. The omission of the period during which the selection signal SEL is temporarily set to the inactive state provides an advantage that the operation speed can be enhanced corresponding to this period shortening.

Working Example 2

Figure 16:
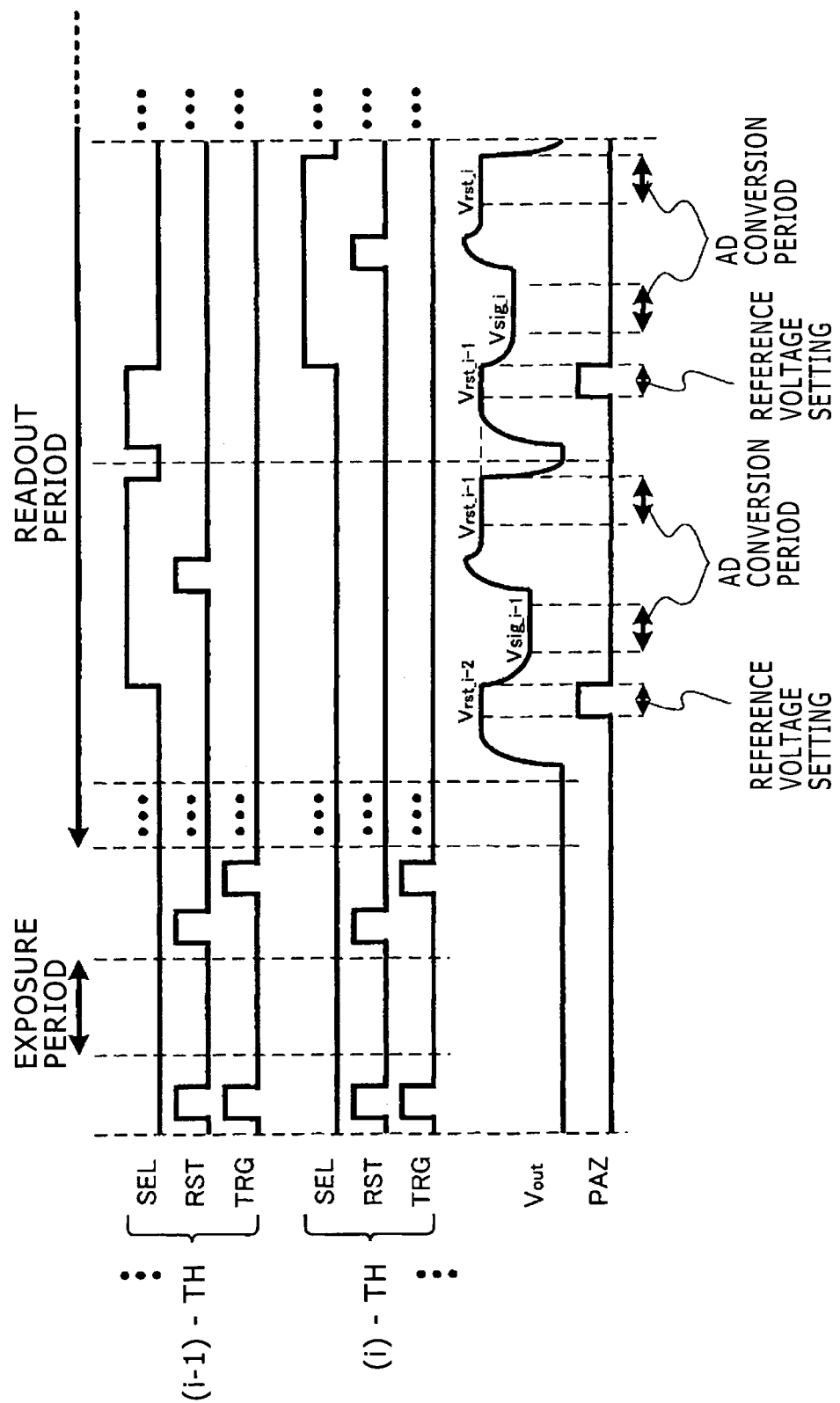
FIG. 16 is a timing waveform diagram for explaining a driving method according to working example 2.

FIG. 16 is a timing waveform diagram for explaining a driving method according to working example 2. The basic operation is the same as that of working example 1. The difference from working example 1 is omission of the operation of resetting the FD part 42 to the reset potential $V_r$ in acquisition of the reference voltage of the AD conversion circuit 23.

In the pixel selected in order to acquire the reference voltage of the AD conversion circuit 23, the FD part 42 has been already reset to the reset potential $V_r$ in order to read out the reset level after readout of the signal level. Therefore, the operation of resetting the FD part 42 in acquisition of the reference voltage can be omitted. This omission of the operation of resetting the FD part 42 in acquisition of the reference voltage of the AD conversion circuit 23 can enhance the operation speed.

However, if voltage variation over time is large due to a leakage current generated in the FD part 42 and so forth, working example 1, in which the FD part 42 is reset to the reset potential $V_r$ again in acquisition of the reference voltage, is more preferable than working example 2.

Working Example 3

Figure 17:
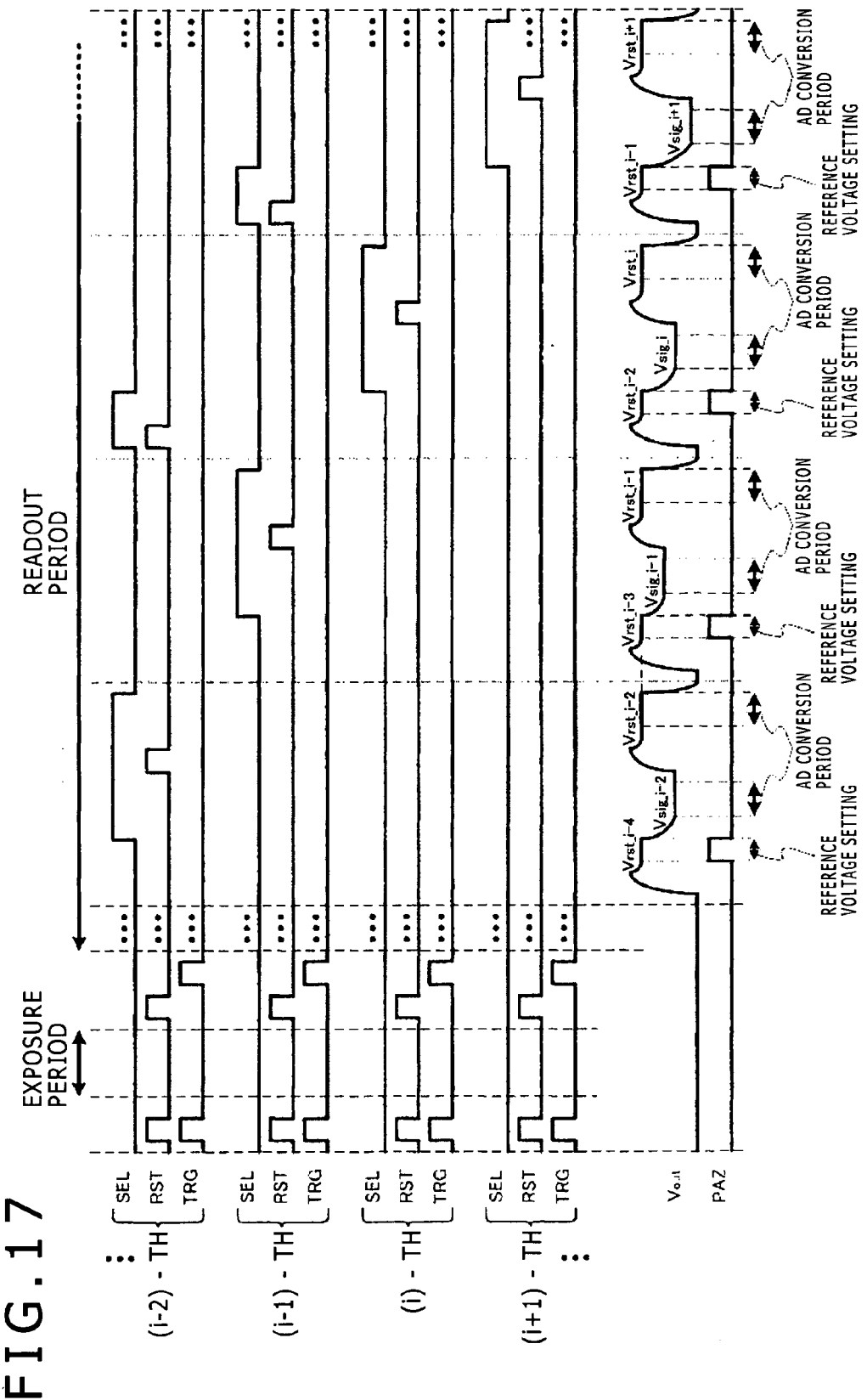
FIG. 17 is a timing waveform diagram for explaining a driving method according to working example 3.

FIG. 17 is a timing waveform diagram for explaining a driving method according to working example 3. As shown in FIG. 17, the (i-p)-th pixel row read out p rows before is selected, and the reset level $V_{rst\_i-p}$ read out through resetting of the FD part 42 to the reset potential $V_r$ is set as the reference voltage $V_{zr}$ of the AD conversion circuit 23. Subsequently, the i-th pixel row is selected and the signal level $V_{sig\_i}$ is read out to carry out AD conversion. Thereafter, the FD part 42 in the pixel on the i-th pixel row is reset to the reset potential $V_r$ and the reset level $V_{rst\_i}$ is read out as the noise level to carry out AD conversion.

For example, in a two-dimensional arrangement in which pixels having plural layout shapes exist in a mixed manner, it is preferable to set p=2 if the pixel having the same layout shape is two rows before, and it is preferable to set p=4 if the pixel having the same layout shape is four rows before. However, for example if two kinds of layout shapes exist in a mixed manner on even-numbered rows and odd-numbered rows, respectively, the value of p is not limited to two, and the pixel having the same layout shape can be selected and thus the advantageous effect can be achieved even when the value of p is four. In particular, for example if the pixel of p=2 is susceptible to the influence of noise due to difference in the interconnect shape and the driving order, using the pixel of p=4 for the reference voltage often provides a higher advantageous effect.

<2. Second Embodiment>
[2-1. System Configuration]

Figure 18:
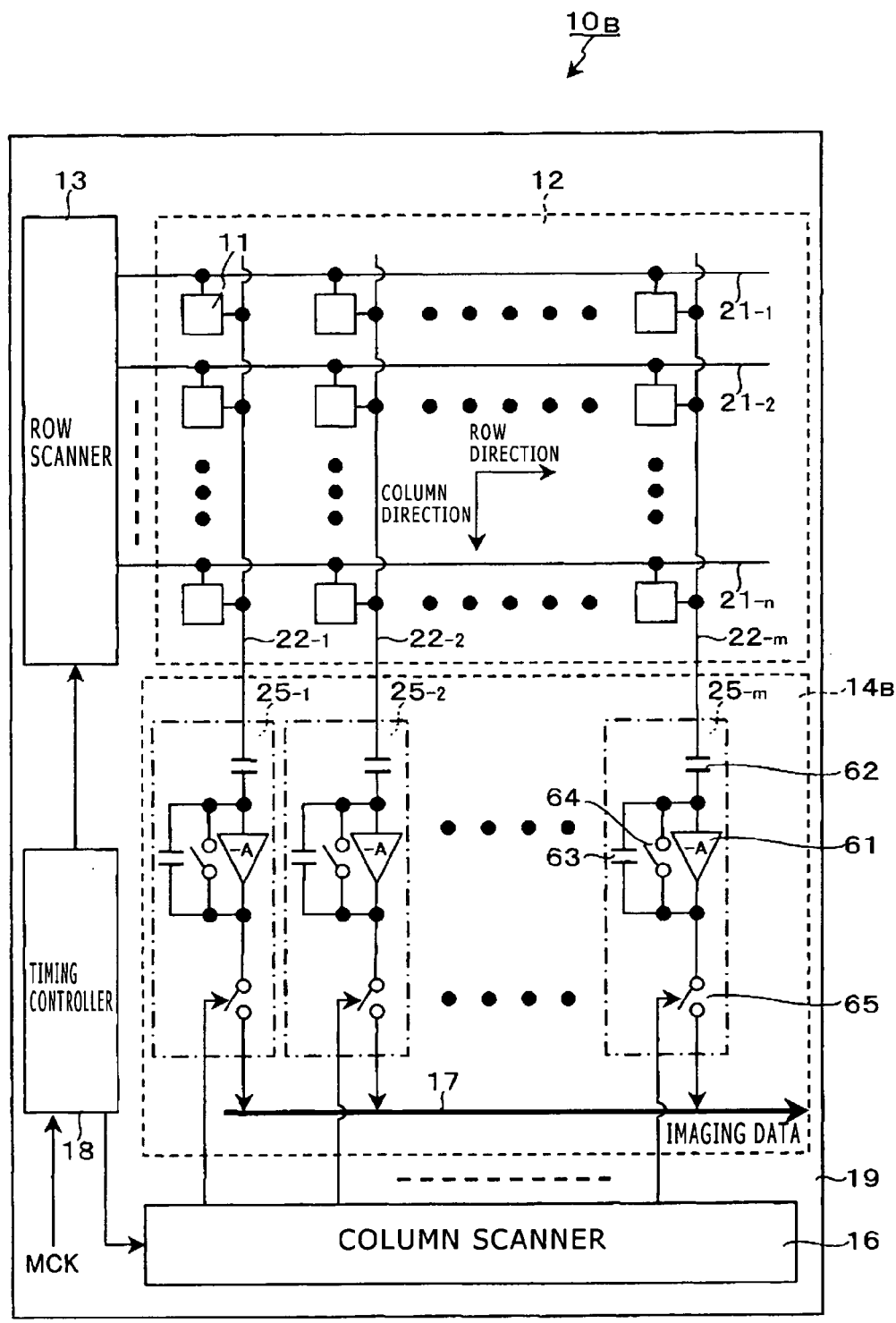
FIG. 18 is a system configuration diagram showing the outline of the configuration of a CMOS image sensor according to a second embodiment of the present invention.

FIG. 18 is a system configuration diagram showing the outline of the configuration of a CMOS image sensor according to a second embodiment of the present invention. In the diagram, part equivalent to that in FIG. 1 is given the same symbols.

As shown in FIG. 18, a CMOS image sensor $10_B$ according to the present embodiment has the pixel array unit 12. In addition, it has, as the peripheral circuit of the pixel array unit 12, e.g. the row scanner 13, a column processor $14_B$, the reference signal generator 15, the column scanner 16, the horizontal output line 17, and the timing controller 18. In the CMOS image sensor $10_B$, only the configuration of the column processor $14_B$ is different from that of the column processor $14_A$ in the first embodiment. The row scanner 13, the reference signal generator 15, the column scanner 16, the horizontal output line 17, and the timing controller 18 are basically the same as those in the first embodiment.

The column processor $14_B$ has column amplifier circuits 25 ($25_{-1}$ to $25_{-m}$) provided for each of the pixel columns of the pixel array unit 12, i.e. for each of the column signal lines 22 ($22_{-1}$ to $22_{-m}$), with a one-to-one correspondence relationship for example. The column amplifier circuits 25 ($25_{-1}$ to $25_{-m}$) execute amplification processing for an analog signal output from each unit pixel 11 of the pixel array unit 12 on a column-by-column basis, and execute correlated double sampling processing of taking the difference between the signal level and the reset level.

All of the column amplifier circuits $25_{-1}$ to $25_{-m}$ have the same configuration. The following description will be made by taking the column amplifier circuit $25_{-m}$ as an example. The column amplifier circuit $25_{-m}$ has an inverting amplifier 61, an input capacitor 62, a feedback capacitor 63, a control switch 64, and a horizontal selection switch 65. The column amplifier circuit $25_{-m}$ amplifies the signal voltage $V_{out}$ supplied from the unit pixel 11 via the column signal line $22_{-m}$ and outputs the amplified signal as an analog signal $V_{amp}$.

In the present example, regarding the column processor $14_B$, the configuration in which the column amplifier circuit 25 is provided for each column signal line 22 with a one-to-one correspondence relationship is taken as an example. However, the arrangement of the column amplifier circuit 25 is not limited to the arrangement based on the one-to-one correspondence relationship. For example, it is also possible to employ a configuration in which one column amplifier circuit 25 is shared by plural pixel columns and used among the plural pixel columns in a time-division manner.

Figure 19:
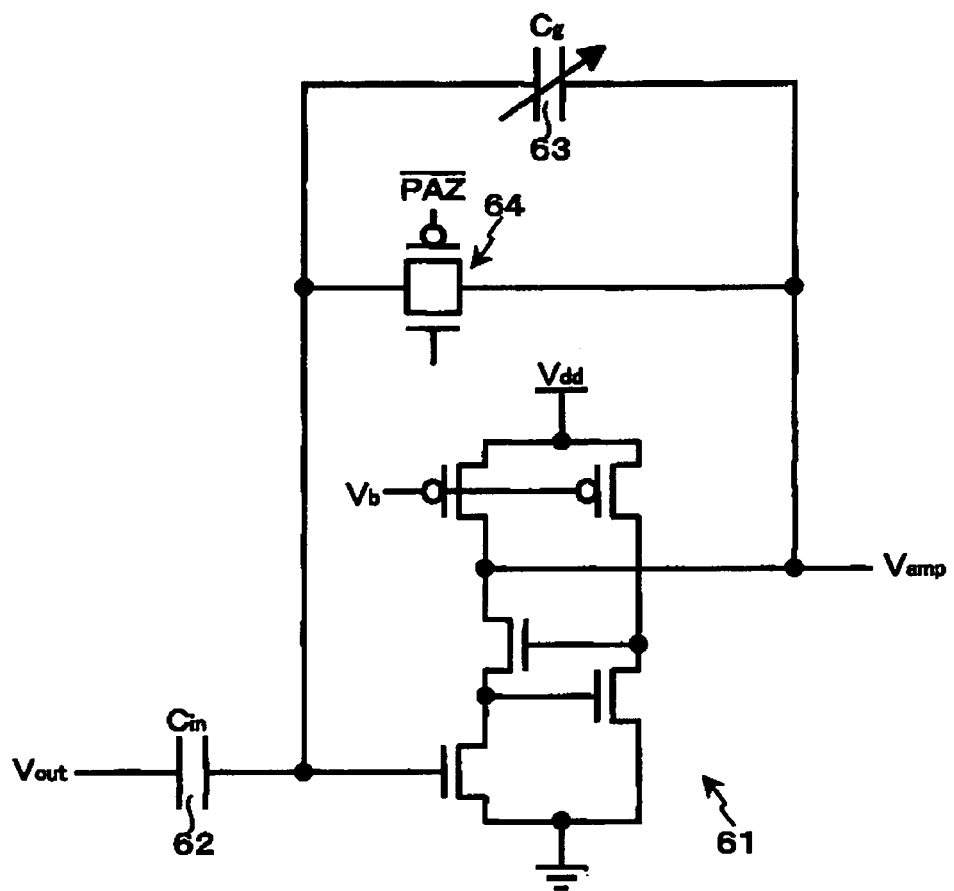
FIG. 19 is a circuit diagram showing a specific circuit example of a column amplifier circuit.
Figure 20:
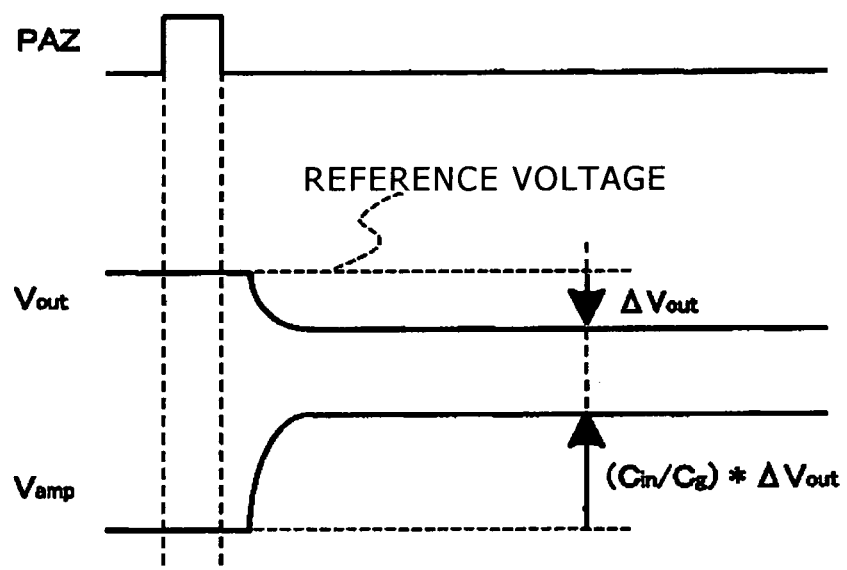
FIG. 20 is a timing waveform diagram showing an operation example of the column amplifier circuit.

FIG. 19 is a circuit diagram showing a specific circuit example of the column amplifier circuit 25. FIG. 20 shows an operation example of the column amplifier circuit 25. Similarly to the AD conversion circuit 23, under control by the control signal PAZ, the input and output terminals of the inverting amplifier 61 are short-circuited by the control switch 64 to thereby acquire the reference voltage of the column amplifier circuit 25.

In the column amplifier circuit 25, the difference $\Delta V_{out}$ from the acquired reference voltage is obtained as the swing of the analog signal $V_{amp}$. In the column amplifier circuit 25, if the capacitance value of the input capacitor 62 is defined as $C_{in}$ and the capacitance value of the feedback capacitor 63 is defined as $C_g$, the analog signal $V_{amp}$ is multiplied by $C_{in}/C_g$, which is the ratio of the capacitance value $C_{in}$ to the capacitance value $C_g$.

[2-2. Characteristic Respects of Second Embodiment]

The CMOS image sensor $10_B$ according to the second embodiment also employs a configuration in which signal readout is performed with the signal charge retained in the FD part 42 for collective exposure of all pixels, similarly to the CMOS image sensor $10_A$ according to the first embodiment. Furthermore, also in the column amplifier circuit 25, the reference voltage needs to be acquired from the reset level at first in order to process both of the signal level and the reset level, similarly to the AD conversion circuit 23.

Thus, also in the second embodiment, before readout of the signal level of a certain unit pixel, the reset level of the FD part 42 in the unit pixel from which readout of the signal level has been already completed is read out and this reset level is set as the reference voltage of the column amplifier circuit 25, similarly to the first embodiment. This reference voltage serves as the basis of the range of the input voltage that can be amplified by the column amplifier circuit 25. By adjusting (shifting) the reference voltage, the input voltage range with respect to the input signal is determined.

By reading out the reset level of the FD part 42 in the unit pixel from which readout of the signal level has been already completed and setting this reset level as the reference voltage of the column amplifier circuit 25 before readout of the signal level in this manner, the same operation and effects as those of the first embodiment can be achieved. Furthermore, the above-described working example 1 to working example 3 can be employed as the working example for setting the reset level of the FD part 42 in the unit pixel from which readout of the signal level has been already completed as the reference voltage of the column amplifier circuit 25.

<3. Other Pixel Configurations>

In the first and second embodiments, the CMOS image sensors $10_A$ and $10_B$ having the global exposure function are taken as examples of the solid-state imaging device in which the reset level cannot be read out before the signal level. The CMOS image sensors $10_A$ and $10_B$ having the global exposure function transfer a charge generated in the photodiode 41 to the FD part 42 simultaneously in all pixels and sequentially carry out readout operation from the state in which the signal charge is retained in this FD part 42, in order to realize collective exposure of all pixels.

However, the solid-state imaging device in which the reset level cannot be read out before the signal level is not limited to the CMOS image sensors $10_A$ and $10_B$ having the global exposure function. Other examples of such a solid-state imaging device include a CMOS image sensor configured with unit pixels having a memory part to retain a photocharge transferred from the photoelectric converter separately from the charge-voltage converter, and an image sensor configured with unit pixels using an organic photoelectric conversion film.

Another Pixel Example 1

Figure 21:
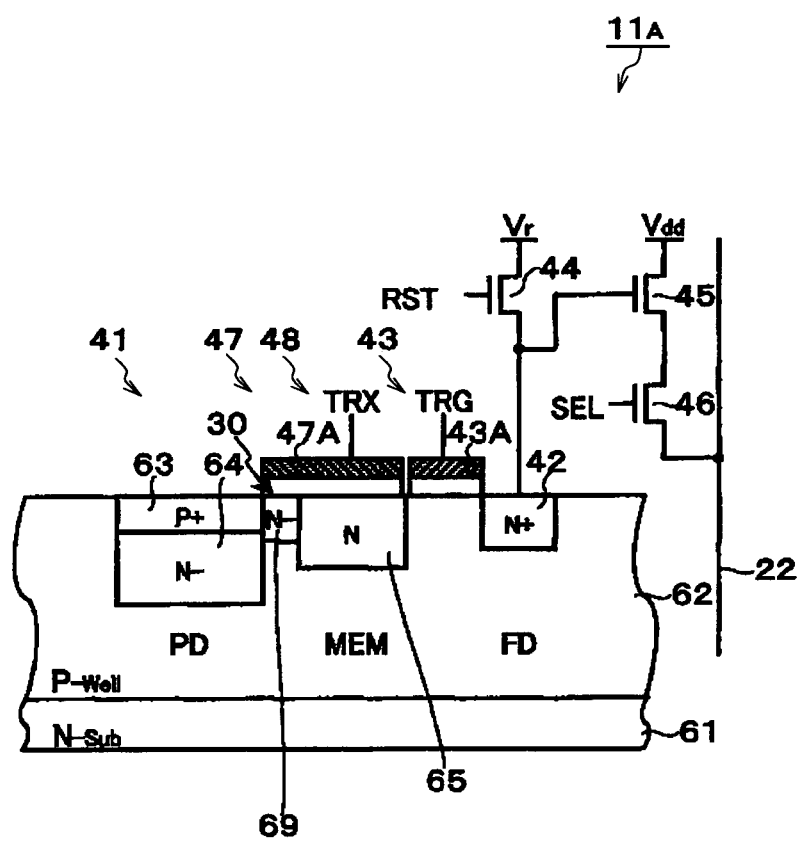
FIG. 21 is a configuration diagram showing one example of a unit pixel according to another pixel example 1, having a memory part to retain a photocharge transferred from a photoelectric converter separately from a charge-voltage converter.

FIG. 21 is a configuration diagram showing one example of the unit pixel according to another pixel example 1, having a memory part to retain a photocharge transferred from the photoelectric converter separately from the charge-voltage converter. In the diagram, part equivalent to that in FIG. 2 is given the same symbols.

In a unit pixel $11_A$ according to another pixel example 1, the photodiode 41 is a buried photodiode formed by forming a P-type impurity layer 63 at a substrate surface part and burying an N-type buried layer 64 in a P-type well layer 62 formed on an N-type substrate 61 for example.

The unit pixel $11_A$ has a first transfer gate part 47, a memory part (MEM) 48, a second transfer gate part 43, and the FD part 42 in addition to the buried photodiode 41. The memory part 48 and the FD part 42 are shielded from light.

The first transfer gate part 47 transfers a charge that arises from photoelectric conversion by the buried photodiode 41 and is accumulated in the inside thereof through application of a transfer signal TRX to a gate electrode $47_A$. The memory part 48 is formed by an N-type buried channel 65 formed under the gate electrode $47_A$ and accumulates the charge transferred from the photodiode 41 by the first transfer gate part 47. That the memory part 48 is formed by the buried channel 65 can suppress generation of a dark current at the Si—SiO$_2$ interface and thus can contribute to enhancement in the image quality.

By disposing the gate electrode $47_A$ above the memory part 48 and applying the transfer signal TRX to this gate electrode $47_A$, modulation can be applied to the memory part 48. Specifically, due to the application of the transfer signal TRX to the gate electrode $47_A$, the potential of the memory part 48 becomes deeper. This can increase the amount of saturated charge of the memory part 48 compared with the case in which the modulation is not applied.

At the boundary part between the photodiode 41 and the memory part 48 under the gate electrode $47_A$, an overflow path 60 is formed by providing an N-type impurity diffusion area 69. This overflow path 60 is used as part to accumulate a charge generated under low illuminance in the photodiode 41 preferentially. Specifically, the charge that is generated in the photodiode 41 and surpasses the potential of the overflow path 60 automatically overflows to the memory part 48 and is accumulated in this memory part 48. In other words, the generated charge equal to or lower than the potential of the overflow path 60 is accumulated in the photodiode 41.

The second transfer gate part 43 transfers the charge accumulated in the memory part 48 through application of a transfer signal TRG to a gate electrode $43_A$. The FD part 42 is a charge-voltage converter formed of an N-type layer and converts the charge transferred from the memory part 48 by the second transfer gate part 43 to a voltage.

Also in the CMOS image sensor configured with the unit pixels $11_A$ according to another pixel example 1, having the memory part 48 to retain a signal charge transferred from the photodiode 41 separately from the FD part 42 as described above, the reset level cannot be read out before the signal level. Therefore, by applying the above-described first and second embodiments also to the CMOS image sensor configured with the unit pixels $11_A$ according to another pixel example 1, the desired aim can be achieved.

Another Pixel Example 2

Figure 22:
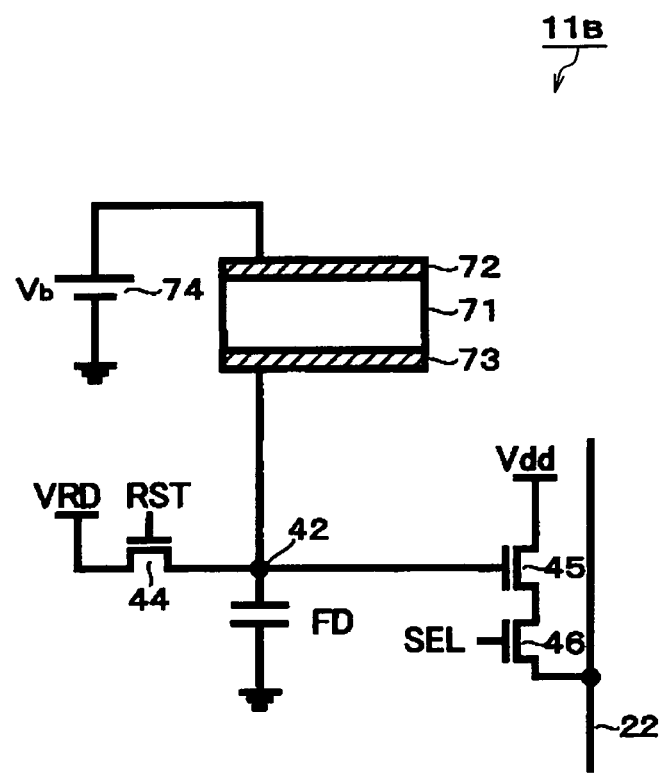
FIG. 22 is a configuration diagram showing one example of a unit pixel according to another pixel example 2, using an organic photoelectric conversion film.

FIG. 22 is a configuration diagram showing one example of the unit pixel according to another pixel example 2, using an organic photoelectric conversion film. In the diagram, part equivalent to that in FIG. 2 is given the same symbols.

In a unit pixel $11_B$ according to another pixel example 2, an organic photoelectric conversion film 71 is sandwiched between an upper electrode 72 and a lower electrode 73. At least the lower electrode 73 is divided on a pixel-by-pixel basis and an electrode having high transparency is used as the lower electrode 73 in many cases. A bias voltage $V_b$ is applied to the upper electrode 72 by a bias power supply 74.

A charge generated by photoelectric conversion in the organic photoelectric conversion film 71 is accumulated in the FD part 42. The charge in the FD part 42 is read out as a voltage from the column signal line 22 via a readout circuit including the amplification transistor 45. The FD part 42 is set to a drain potential $V_r$ by the reset transistor 44. The drain potential $V_r$ of the reset transistor 44 can be shifted from a voltage $V_{r1}$ lower than the potential of the depleted part of the FD part 42 on the side of the reset transistor 44 to a voltage $V_{r2}$ higher than the potential.

Also in the image sensor configured with the unit pixels $11_B$ according to another pixel example 2, using the organic photoelectric conversion film 71 as described above, the reset level cannot be read out before the signal level. Therefore, by applying the above-described first and second embodiments also to the image sensor configured with the unit pixels $11_B$ according to another pixel example 2, the desired aim can be achieved.

<4. Modification Examples>

Although the above-described respective embodiments relate to examples of application to a CMOS image sensor obtained by arranging unit pixels in a matrix, the present invention is not limited to the application to the CMOS image sensor. That is, the present invention can be applied to the overall solid-state imaging device of the X-Y address system obtained by arranging unit pixels in a matrix.

Furthermore, the present invention is not limited to application to the solid-state imaging device that detects the distribution of the amount of incident visible light and performs imaging of the distribution, but can be applied to the overall solid-state imaging device that performs imaging of the distribution of the amount of incidence of infrared rays, X rays, particles, etc as an image.

The solid-state imaging device may be in the form of being formed as one chip, or may be in the form of a module having an imaging function obtained by collectively packaging an imaging unit, a signal processor, and an optical system.

<5. Electronic Apparatus>

The present invention is not limited to application to the solid-state imaging device but can be applied to the overall electronic apparatus using a solid-state imaging device as its image capturing unit (photoelectric converter), such as imaging apparatus typified by digital still cameras and video camcorders and portable terminal apparatus having an imaging function, typified by cellular phones. A copy machine using a solid-state imaging device as its image reading unit is also encompassed in the electronic apparatus using a solid-state imaging device as its image capturing unit. The form of the above-described module incorporated in electronic apparatus, i.e. a camera module, is regarded as imaging apparatus in some cases.

(Imaging Apparatus)

Figure 23:
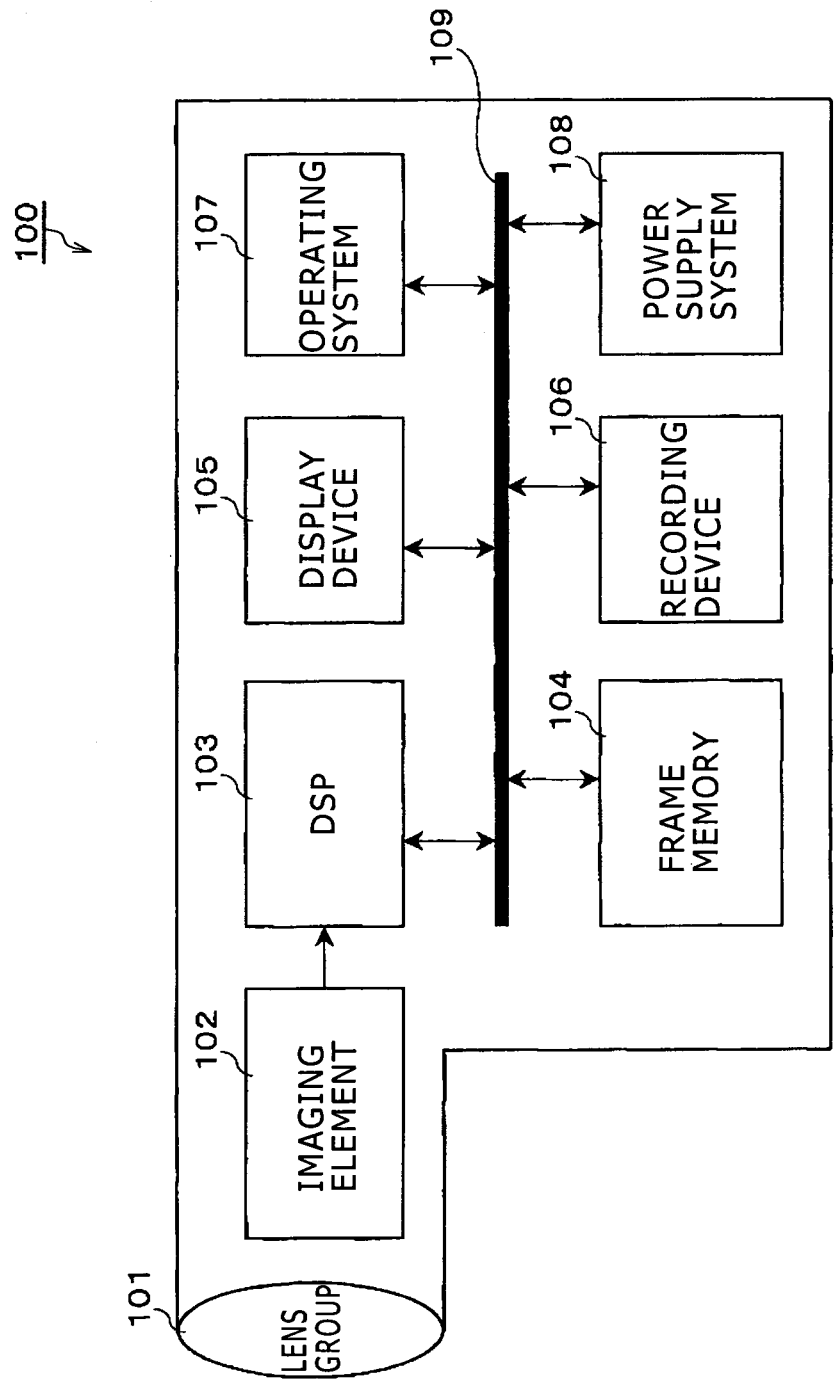
FIG. 23 is a block diagram showing one example of the configuration of an electronic apparatus according to he embodiment of the present invention, e.g. imaging apparatus.
Figure 24:
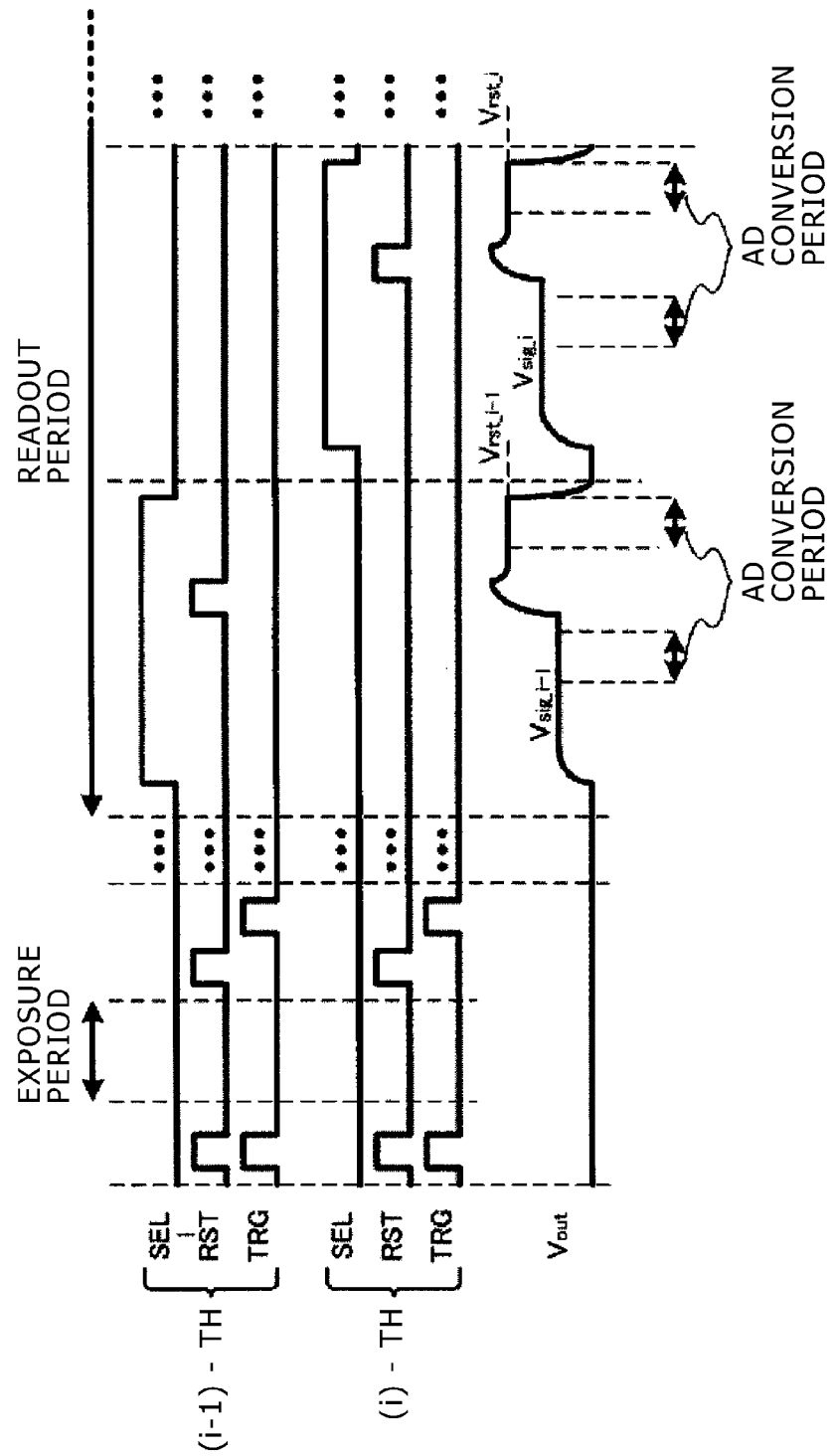
FIG. 24 is a diagram for explaining that the reset level needs to be read out after the signal level is read out in order to remove fixed pattern noise.
Figure 25:
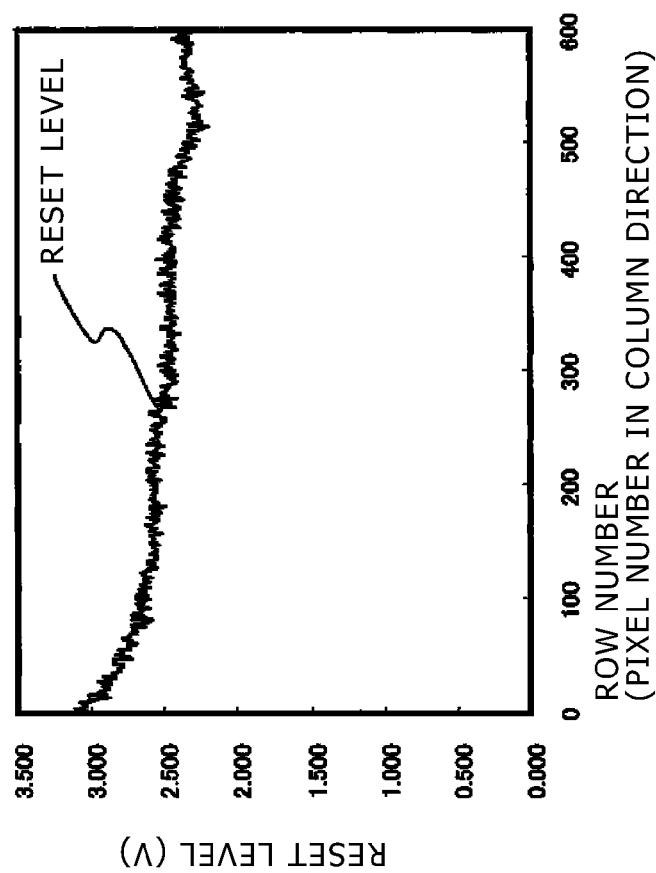
FIG. 25 is a diagram showing one example of the in-plane distribution of the reset level in the vertical direction.
Figure 26:
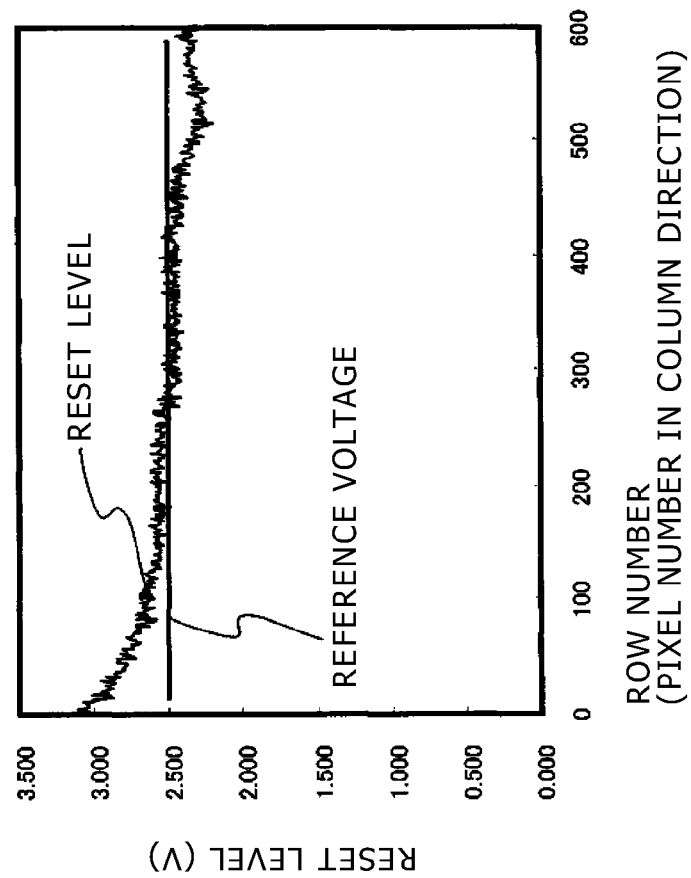
FIG. 26 is a diagram for explaining that the input voltage range of the AD conversion circuit needs to be broadened if a constant voltage is applied as the reference voltage.
Figure 27:
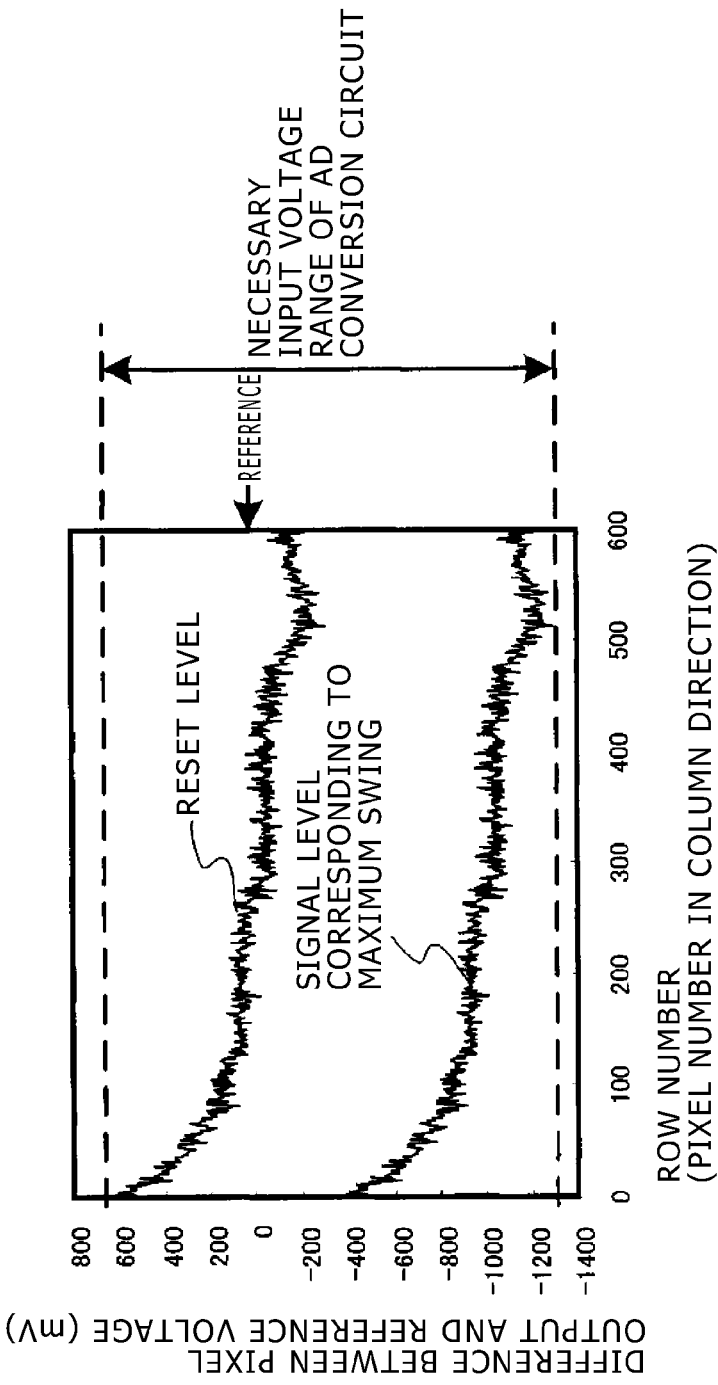
FIG. 27 is a diagram showing the reset level and the signal level corresponding to the maximum swing with respect to the reference voltage when the maximum signal swing is −1 V.

FIG. 23 is a block diagram showing one example of the configuration of electronic apparatus according to the present invention, e.g. imaging apparatus.

As shown in FIG. 23, imaging apparatus 100 according to the embodiment of the present invention has an optical system including a lens group 101 and so forth, an imaging element (imaging device) 102, a DSP circuit 103, a frame memory 104, a display device 105, a recording device 106, an operating system 107, and a power supply system 108. The DSP circuit 103, the frame memory 104, the display device 105, the recording device 106, the operating system 107, and the power supply system 108 are connected to each other via a bus line 109.

The lens group 101 captures incident light (image light) from a subject and forms its image on the imaging plane of the imaging element 102. The imaging element 102 converts the amount of incident light from which the image is formed on the imaging plane by the lens group 101 to an electrical signal on a pixel-by-pixel basis and outputs the electrical signal as a pixel signal.

The display device 105 is formed of a panel display device such as a liquid crystal display device or an organic electro luminescence (EL) display device, and displays a moving image or a still image obtained by the imaging by the imaging element 102. The recording device 106 records the moving image or still image obtained by the imaging by the imaging element 102 in a recording medium such as a videotape and a digital versatile disk (DVD).

The operating system 107 issues an operation command regarding various functions possessed by the present imaging apparatus under operation by the user. The power supply system 108 properly supplies various kinds of power supply serving as the operating power supply for the DSP circuit 103, the frame memory 104, the display device 105, the recording device 106, and the operating system 107 to these supply targets.

The imaging apparatus having the above-described configuration can be used as imaging apparatus such as a video camcorder, a digital still camera, and a camera module for mobile apparatus typified by a cellular phone, etc. Furthermore, by using a solid-state imaging device such as the CMOS image sensors $10_A$ and $10_B$ according to the above-described respective embodiments as the imaging element 102 in this imaging apparatus, the following operation and effects can be achieved.

Specifically, the CMOS image sensors $10_A$ and $10_B$ according to the above-described respective embodiments can realize imaging free from distortion by global exposure. Therefore, this imaging apparatus can be realized as imaging apparatus suitable to be used for imaging of a subject moving at high speed and a sensing purpose requiring the simultaneity of the captured image, in each of which image distortion is unacceptable.

Furthermore, the CMOS image sensors $10_A$ and $10_B$ according to the above-described respective embodiments can effectively remove difference due to large characteristic fluctuation in the plane (in-plane distribution) and an offset component dependent on the magnitude of parasitic capacitance. This makes it possible to decrease the margin necessary for the range of the input voltage that can be processed by the signal processer with respect to the swing of the pixel output, and thus can achieve reduction in the supply voltage and power consumption of the signal processor. This allows contribution to reduction in the voltage and power consumption of various kinds of electronic apparatus.

The present application contains subject matter related to that disclosed in Japanese Priority Patent Application JP 2010-072309 filed with the Japan Patent Office on Mar. 26, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device, comprising:
a pixel array unit configured to be formed by two-dimensionally arranging unit pixels each having a photoelectric converter, a charge-voltage converter, a reset transistor to set the charge-voltage converter to a predetermined potential, and an amplification transistor to read out a signal converted by the charge-voltage converter;
a signal processor configured to process a signal output from the unit pixel by using a reference voltage; and
a setter configured to set a reset level obtained from a second unit pixel from which a signal level has been already read out as the reference voltage of the signal processor before readout of a signal level based on a signal charge accumulated or retained in the charge-voltage converter from a first unit pixel.

2. The solid-state imaging device according to claim 1, wherein
in the first unit pixel, after a signal charge accumulated or retained in the charge-voltage converter is read out as the signal level, the charge-voltage converter is set to the predetermined potential by the reset transistor and the predetermined potential is read out as the reset level.

3. The solid-state imaging device according to claim 1, wherein
the signal processor executes signal processing of taking difference between the signal level and the reset level.

4. The solid-state imaging device according to claim 1, wherein
the second unit pixel is a unit pixel having high correlation physically with the first unit pixel.

5. The solid-state imaging device according to claim 4, wherein
the second unit pixel is a unit pixel located near the first unit pixel on the two-dimensional arrangement.

6. The solid-state imaging device according to claim 4, wherein
the second unit pixel has the same layout shape as a layout shape of the first unit pixel.

7. The solid-state imaging device according to claim 4, wherein
the second unit pixel is a unit pixel that has the same layout shape as a layout shape of the first unit pixel and is disposed closest physically to the first unit pixel.

8. The solid-state imaging device according to claim 4, wherein
the second unit pixel is a unit pixel from which a signal level and a reset level are read out immediately before the first unit pixel.

9. The solid-state imaging device according to claim 1, wherein
the setter sets the charge-voltage converter to the predetermined potential by the reset transistor in readout of a reset level set as the reference voltage from the second unit pixel.

10. The solid-state imaging device according to claim 1, wherein
the signal processor is an analog-digital conversion circuit that converts the signal level and the reset level output by an analog signal from the unit pixel to a digital signal, and
the reference voltage is a voltage serving as a basis of a range of an input voltage that is capable of being converted by the analog-digital conversion circuit.

11. The solid-state imaging device according to claim 1, wherein
the signal processor is an amplifier circuit that amplifies the signal level and the reset level output by an analog signal from the unit pixel, and
the reference voltage is a voltage serving as a basis of a range of an input voltage that is capable of being amplified by the amplifier circuit.

12. A method for driving a solid-state imaging device including a pixel array unit formed by two-dimensionally arranging unit pixels each having a photoelectric converter, a charge-voltage converter, a reset transistor to set the charge-voltage converter to a predetermined potential, and an amplification transistor to read out a signal converted by the charge-voltage converter, and a signal processor to process a signal output from the unit pixel by using a reference voltage, the method, comprising the step of
setting a reset level obtained from a second unit pixel from which a signal level has been already read out as the reference voltage of the signal processor before readout of a signal level based on a signal charge accumulated or retained in the charge-voltage converter from a first unit pixel.

13. An electronic apparatus having a solid-state imaging device, comprising:
a pixel array unit configured to be formed by two-dimensionally arranging unit pixels each having a photoelectric converter, a charge-voltage converter, a reset transistor to set the charge-voltage converter to a predetermined potential, and an amplification transistor to read out a signal converted by the charge-voltage converter;
a signal processor configured to process a signal output from the unit pixel by using a reference voltage; and
a setter configured to set a reset level obtained from a second unit pixel from which a signal level has been already read out as the reference voltage of the signal processor before readout of a signal level based on a signal charge accumulated or retained in the charge-voltage converter from a first unit pixel.

14. A solid-state imaging device, comprising:
pixel array means for being formed by two-dimensionally arranging unit pixels each having a photoelectric converter, a charge-voltage converter, a reset transistor to set the charge-voltage converter to a predetermined potential, and an amplification transistor to read out a signal converted by the charge-voltage converter;
signal processing means for processing a signal output from the unit pixel by using a reference voltage; and
setting means for setting a reset level obtained from a second unit pixel from which a signal level has been already read out as the reference voltage of the signal processing means before readout of a signal level based on a signal charge accumulated or retained in the charge-voltage converter from a first unit pixel.

* * * * *